US012463675B2

(12) United States Patent
Va et al.

(10) Patent No.: US 12,463,675 B2
(45) Date of Patent: Nov. 4, 2025

(54) RADIO FREQUENCY EXPOSURE ESTIMATION WITH RADAR FOR MOBILE DEVICES

(71) Applicant: Samsung Electronics Co., Ltd., Suwon-si (KR)

(72) Inventors: Vutha Va, Plano, TX (US); Anum Ali, Plano, TX (US); Jianhua Mo, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 17/654,386

(22) Filed: Mar. 10, 2022

(65) Prior Publication Data

US 2023/0041835 A1 Feb. 9, 2023

Related U.S. Application Data

(60) Provisional application No. 63/229,651, filed on Aug. 5, 2021.

(51) Int. Cl.
*H04B 1/38* (2015.01)
*G01S 7/41* (2006.01)
(Continued)

(52) U.S. Cl.
CPC ............ *H04B 1/3838* (2013.01); *G01S 7/415* (2013.01); *G01S 13/86* (2013.01); *H04W 52/30* (2013.01)

(58) Field of Classification Search
CPC ....... H04B 1/3838; G01S 7/415; G01S 13/86; H04W 52/30
(Continued)

(56) References Cited

U.S. PATENT DOCUMENTS 7,146,139 B2 12/2006 Nevermann
9,179,299 B2 11/2015 Schlub et al.
(Continued)

FOREIGN PATENT DOCUMENTS

KR 10-2000-0049943 A 8/2000
KR 10-2002-0042375 A 6/2002
(Continued)

OTHER PUBLICATIONS

International Search Report and Written Opinion issued Oct. 27, 2022 regarding International Application No. PCT/KR2022/010547, 10 pages.
(Continued)

*Primary Examiner* — William Kelleher
*Assistant Examiner* — Samarina Makhdoom

(57) ABSTRACT

A method for exposure level estimation, includes transmitting radar signals for object detection and communication signals for wireless communication operations. The method also includes identifying a location of an object relative to the electronic device within a first time duration based on the radar signals, the first time duration including a previous time until a current time. The method further includes determining a radio frequency (RF) exposure measurement associated with the object based on the location of the object over the first time duration. Additionally, the method includes determining a power density budget over a second time duration based on a comparison of the RF exposure measurement to an RF exposure threshold, the second time duration including the current time until a future time. The method also includes modifying the wireless communication operations for the second time duration based on the power density budget.

20 Claims, 24 Drawing Sheets

(51) Int. Cl.

| | |
|---|---|
| ***G01S 13/86*** | (2006.01) |
| ***H04B 1/3827*** | (2015.01) |
| ***H04W 52/30*** | (2009.01) |

(58) Field of Classification Search
USPC .......................................................... 342/132
See application file for complete search history.

(56) References Cited

U.S. PATENT DOCUMENTS

| | | | |
|---|---|---|---|
| 9,408,160 | B2 | 8/2016 | Kil et al. |
| 10,291,309 | B2 | 5/2019 | Chakraborty et al. |
| 11,019,575 | B2 | 5/2021 | Godala et al. |
| 2012/0142393 | A1 | 6/2012 | Won et al. |
| 2018/0160377 | A1 | 6/2018 | Abramsky et al. |
| 2019/0200365 | A1 | 6/2019 | Sampath et al. |
| 2019/0298208 | A1* | 10/2019 | Weinstein .......... A61B 5/02438 |
| 2019/0353750 | A1* | 11/2019 | Rimini ................. H04B 1/3838 |
| 2019/0361100 | A1* | 11/2019 | Abari ...................... G01S 17/42 |
| 2020/0015171 | A1 | 1/2020 | Nadakuduti et al. |
| 2020/0044612 | A1 | 2/2020 | Bologna et al. |
| 2020/0145079 | A1 | 5/2020 | Marinier et al. |
| 2020/0267662 | A1 | 8/2020 | Godala et al. |
| 2020/0284908 | A1* | 9/2020 | Paulsen ................. G01S 7/4861 |
| 2020/0297236 | A1 | 9/2020 | Rimini et al. |
| 2020/0300996 | A1 | 9/2020 | Cetinoneri et al. |
| 2020/0389856 | A1 | 12/2020 | Yao et al. |
| 2020/0411960 | A1* | 12/2020 | Ng .......................... G01S 13/10 |
| 2021/0055386 | A1* | 2/2021 | Rimini .................... G01S 7/003 |
| 2021/0099194 | A1 | 4/2021 | Jadhav et al. |
| 2021/0126719 | A1 | 4/2021 | Rimini |
| 2021/0175919 | A1* | 6/2021 | Badic ................ H04W 72/0446 |

FOREIGN PATENT DOCUMENTS

| | | | | |
|---|---|---|---|---|
| KR | 10-2009-0074546 | A | 7/2009 | |
| KR | 10-2012-0062357 | A | 6/2012 | |
| KR | 10-2013-0008947 | A | 1/2013 | |
| KR | 10-2014-0041939 | A | 4/2014 | |
| WO | WO-2018160886 | A1 * | 9/2018 | ............. G01S 17/10 |
| WO | 2019221977 | A1 | 11/2019 | |
| WO | WO-2021008710 | A1 * | 1/2021 | ........... H04B 17/318 |

OTHER PUBLICATIONS

Extended European Search Report issued Sep. 26, 2024 regarding Application No. 22853307.1, 8 pages.

* cited by examiner

RADIO FREQUENCY EXPOSURE ESTIMATION WITH RADAR FOR MOBILE DEVICES

CROSS-REFERENCE TO RELATED APPLICATION AND CLAIM OF PRIORITY

This application claims priority under 35 U. S.C. § 119(e) to U.S. Provisional Patent Application No. 63/229,651 filed on Aug. 5, 2021. The above-identified provisional patent application is hereby incorporated by reference in its entirety.

TECHNICAL FIELD

This disclosure relates generally to electronic devices. More specifically, this disclosure relates to radio frequency exposure estimation with radar for mobile devices.

BACKGROUND

The use of mobile computing technology such as a portable electronic device has greatly expanded largely due to usability, convenience, computing power, and the like. One result of the recent technological development is that electronic devices are becoming more compact, while the number of functions and features that a given device can perform is increasing. For example, certain electronic devices not only provide voice call services or internet browsing using a mobile communication network but can also offer radar capabilities.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. With the increase of mobile communication, care must be taken to minimize radio frequency exposure to the user of the electronic device.

SUMMARY

This disclosure relates to radio frequency exposure estimation with radar for mobile devices.

In one embodiment, electronic device is provided. The electronic device includes a radar transceiver, a communication interface, and a processor. The processor is operably connected to the radar transceiver and the communication interface. The processor is configured to transmit radar signals, via the radar transceiver, for object detection. The processor is also configured to transmit communication signals, via the communication interface, for wireless communication operations. The processor is further configured to identify a location of an object relative to the electronic device within a first time duration based on the radar signals, the first time duration including a previous time until a current time. Additionally, the processor is configured to determine a radio frequency (RF) exposure measurement associated with the object based on the location of the object over the first time duration. The processor is also configured to determine a power density budget over a second time duration based on a comparison of the RF exposure measurement to an RF exposure threshold, the second time duration including the current time until a future time. The processor is further configured to modify the wireless communication operations for the second time duration based on the power density budget.

In another embodiment, a method is provided. The method includes transmitting radar signals for object detection and communication signals for wireless communication operations. The method also includes identifying a location of an object relative to the electronic device within a first time duration based on the radar signals, the first time duration including a previous time until a current time. The method further includes determining an RF exposure measurement associated with the object based on the location of the object over the first time duration. Additionally, the method includes determining a power density budget over a second time duration based on a comparison of the RF exposure measurement to an RF exposure threshold, the second time duration including the current time until a future time. The method also includes modifying the wireless communication operations for the second time duration based on the power density budget.

In yet another embodiment a non-transitory computer readable medium embodying a computer program is provided. The computer program comprising computer readable program code that, when executed by a processor of an electronic device, causes the processor to transmit (i) radar signals for object detection and (ii) communication signals for wireless communication operations; identify a location of an object relative to the electronic device within a first time duration based on the radar signals, the first time duration including a previous time until a current time, determine an RF exposure measurement associated with the object based on the location of the object over the first time duration; determine a power density budget over a second time duration based on a comparison of the RF exposure measurement to an RF exposure threshold, the second time duration including the current time until a future time; and modify the wireless communication operations for the second time duration based on the power density budget.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
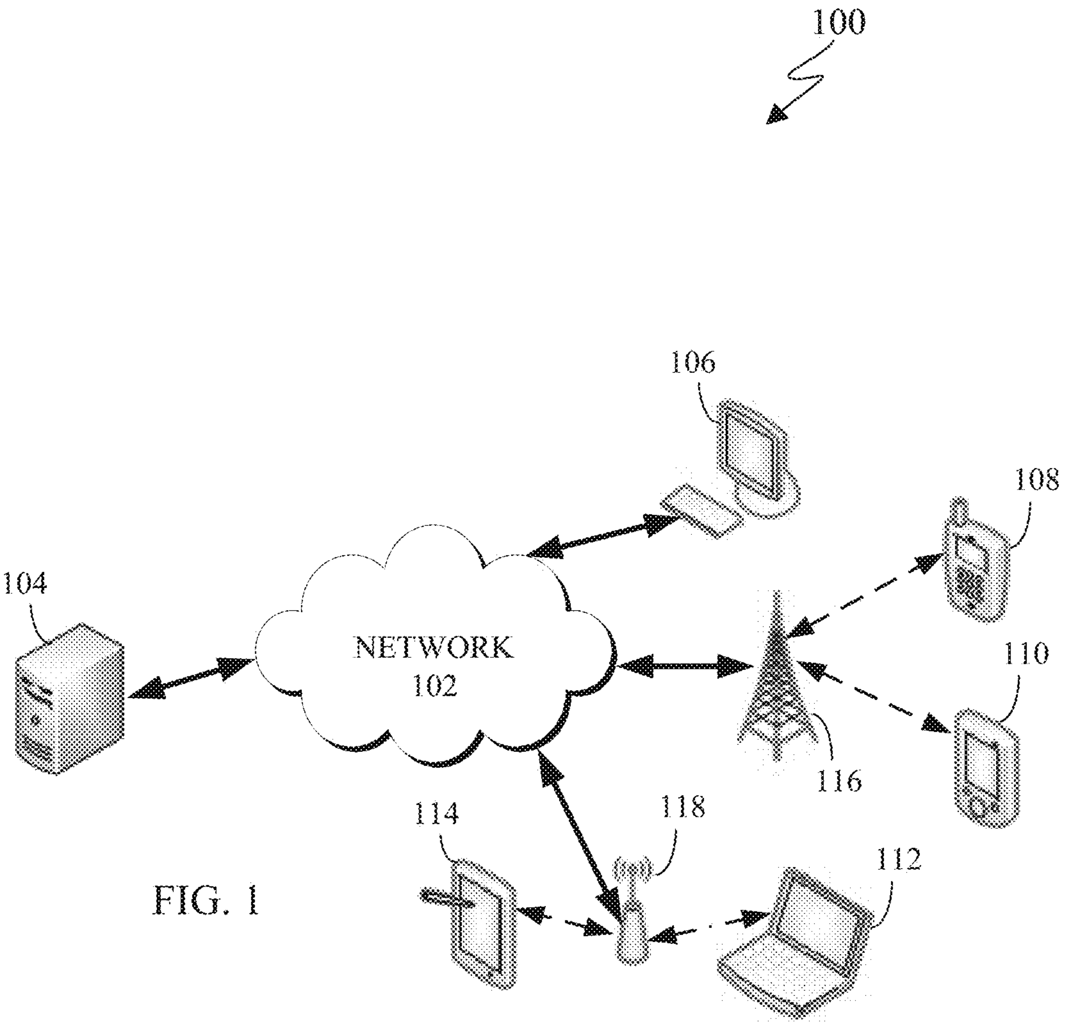
FIG. 1 illustrates an example communication system according to embodiments of this disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

To meet the demand for wireless data traffic having increased since deployment of the fourth generation (4G) communication systems, efforts have been made to develop and deploy an improved 5th generation (5G) or pre-5G or new radio (NR) communication system. Therefore, the 5G or pre-5G communication system is also called a "beyond 4G network" or a "post long term evolution (LTE) system."

The 5G communication system is considered to be implemented in higher frequency (such as millimeter wave (mmWave)) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

An electronic device, according to embodiments of the present disclosure can include a user equipment (UE) such as a 5G terminal. The electronic device can also refer to any component such as mobile station, subscriber station, remote terminal, wireless terminal, receive point, vehicle, or user device. The electronic device could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. Additionally, the electronic device can include a personal computer (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), a portable multimedia player (PMP), an MP3 player, a mobile medical device, a virtual reality headset, a portable game console, a camera, and a wearable device, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device.

Figure 4A:
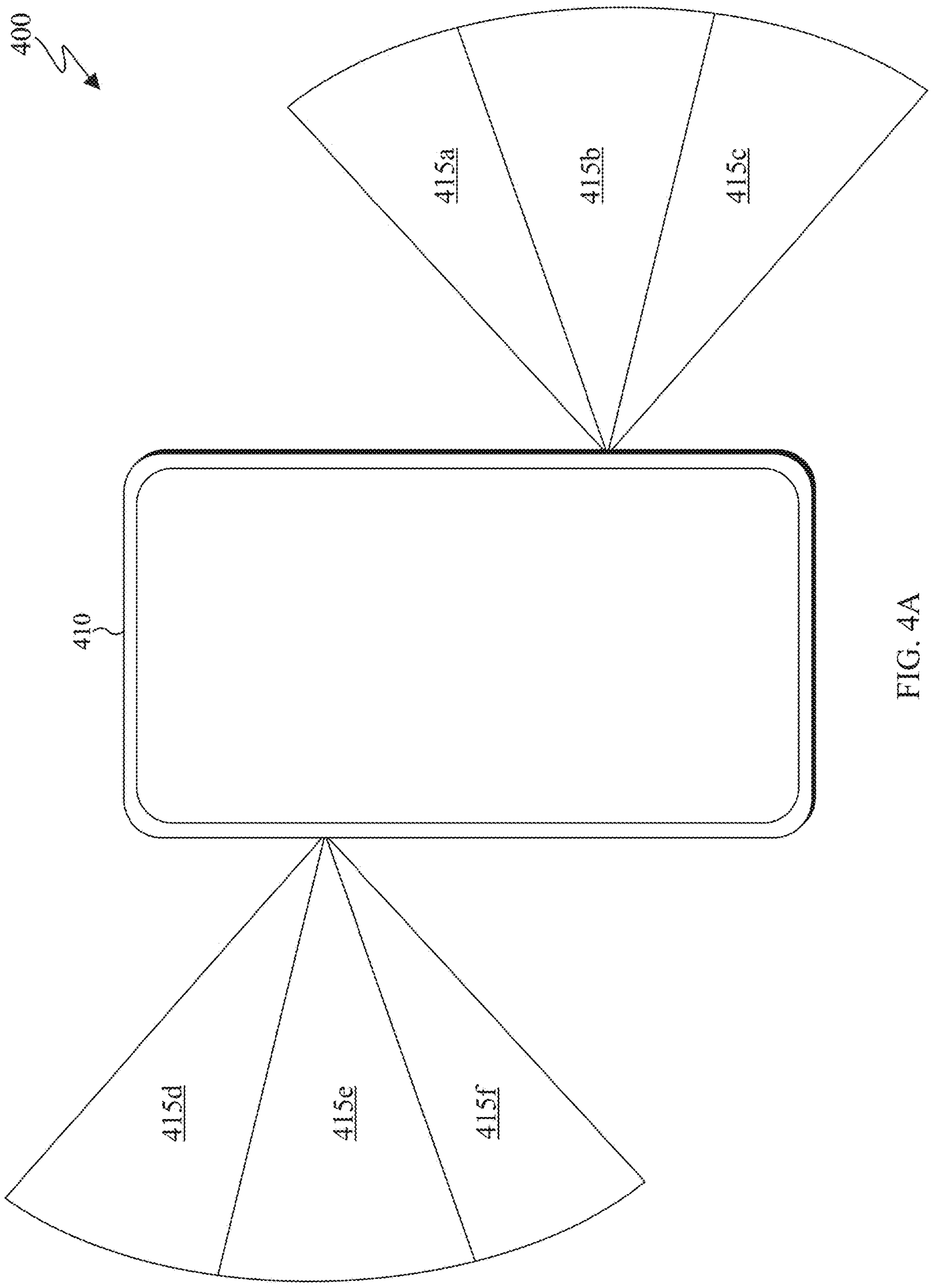
FIG. 4A illustrates a diagram of an electronic device with multiple field of view regions corresponding to beams according to embodiments of this disclosure.

Beamforming is an important factor when an electronic device (such as a UE) tries to establish a connection with a base station (BS). To compensate for the increasing path loss at high frequencies, analog beams sweeping can be employed to support narrow beams that enable wider signal reception or transmission coverage for the UE. A beam codebook comprises a set of codewords, where a codeword is a set of analog phase shift values, or a set of amplitude plus phase shift values, applied to the antenna elements, in order to form an analog beam. FIG. 4A, described below, illustrates a UE equipped with two mmWave antenna modules or panels located on the left and the right edges of the UE. A beam management procedure is implemented at the UE to maintain the best antenna module as well as the corresponding best beam of the antenna module for signal reception and transmission by the UE. The UE may also use multiple antenna modules simultaneously, in which case the beam management procedure can determine the best beam of each antenna module for signal reception and transmission by the UE.

Embodiments of the present disclosure take into consideration that beamforming is a used for reliable mmWave communications but at the same time beamforming also can cause a concern for radio frequency exposure on human body, beyond various governmental regulations. Beamforming is typically used at both the infrastructure or network side (such as at the base station or the access point) and the UE side. The process of beamforming is to adjust the antenna weights such that the transmission energy is concentrated in some direction. This focus of energy can help provide strong link signal for communications, but at the same time this means more radiation power in that direction and could raise concern on the exposure to body of the user. Due to such health concern, regulatory bodies (such as the Federal Communications Commission (FCC) in the United States of America) have sets of regulations and guidance governing such exposure. Exposure includes both exposure at low frequency (<6GHz) and exposure at high frequency (>6GHz). Power density (PD) is used as the exposure metric at high frequency.

Exposure limit poses a challenge regarding 5G millimeter wave uplink (UL). As discussed above, narrow beams (formed by beamforming techniques) are used for 5G millimeter wave operation, however, beamforming increases the PD and, consequently, the exposure. Certain mmWave communications take a very conservative measure to meet the exposure regulations. For example, one such approach is to use low enough Equivalent Isotropically Radiated Power (EIRP) by adjusting the duty cycle and either (i) lowering the transmit (TX) power, (ii) lowering the beamforming gain, or (iii) both lower the TX power and the beamforming gain.

Embodiments of the present disclosure take into consideration that while such a conservative measure can ensure regulatory compliance, it forces the communication module to operate at suboptimal link quality and thus the electronic device cannot reap the potential for very high data rate services. For example, some solutions (non-sensing solutions) assume worst case exposure. Embodiments of the present disclosure take into consideration that to guard against exceeding the limit, using low power, using wide beams, or a combination thereof. Using low power or wide beams can limit UL quality in both coverage and throughput.

Accordingly, embodiments of the present disclosure relate to using radar to assess a situation by sensing the surroundings of the electronic device. By assessing the situation, the electronic device can avoid a pessimistic TX power control. For example, a smart exposure control solution can keep exposure compliance while minimizing the opportunity loss for communication beamforming operations. Embodiments of the present disclosure describe using radar to estimate RF exposure levels on a human body for determining whether there is an exposure risk. Upon detecting a body part, the electronic device can manage the beams for communication to maintain regulatory RF exposure compliance while operating at enhanced link quality.

Radar sensing can be used for ranging, angle estimation or both. For example, when radar is used for ranging only, the electronic device can determine whether a human body part is present and adjust the TX power. For another example, when radar is used for ranging and angle estimation, the electronic device can determine whether a human body part is present and its approximate location and adjust the TX power, for beamforming, based on the location of the human body part. For instance, the electronic device can reduce the TX power at or near the location of the human body part and increase the TX power at locations where the human body part is absent. For yet another example, when radar is used for ranging and angle, the electronic device can determine whether a human body part is present and its approximate location and modify one or more beams for beamforming based on the location of the human body part. In this example, the angle information can be used to identify if the body part is within the main beam direction of certain beams.

For example, the electronic device can determine whether a body part of a human is within a field of view (FoV) of a communication interface. Then depending on radar capabilities, the electronic device can perform a communication interface level or beam level adjustment to maintain exposure compliance. Communication interface can include an antenna panel. In certain embodiments, the communication interface has a radar FoV that is the same or similar to a FoV of wireless communication. An electronic device may operate using the communication interface level for maintaining exposure compliance such as when electronic device, using radar, cannot detect the angle between the electronic device and an object. This can occur if the electronic device has only one radar antenna or does not have enough angular resolution. For maintaining exposure compliance at the communication interface level, if the radar detects the presence of body part within its FoV, the electronic device may cause the communication interface to reduce the transmit power, revert to using less directional beam, abort the transmission altogether if the exposure risk is too high, or any combination thereof.

Figure 4B:
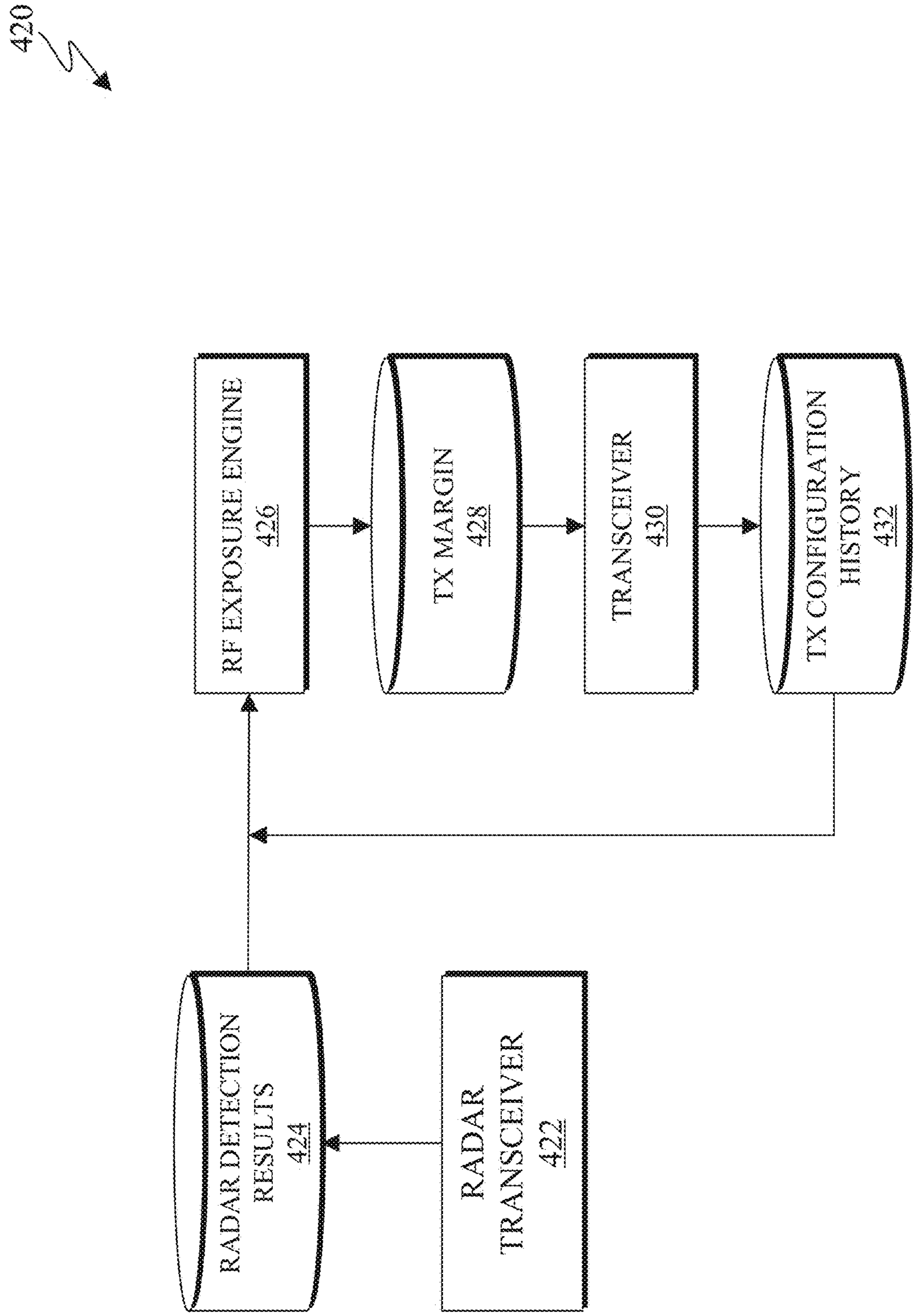
FIG. 4B illustrates a signal processing diagram for controlling radio frequency (RF) exposure according to embodiments of this disclosure.
Figure 4C:
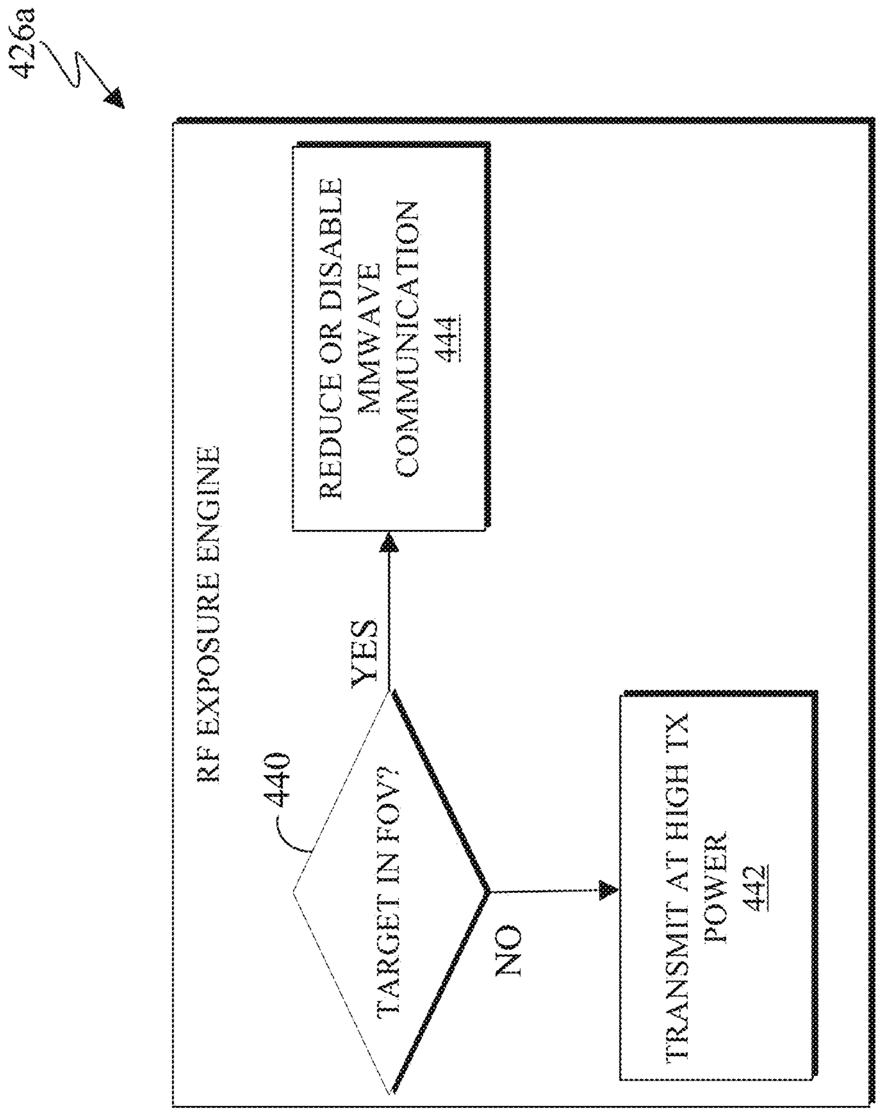
FIGS. 4C and 4D illustrate processes for RF level exposure modifications according to embodiments of this disclosure.
Figure 4D:
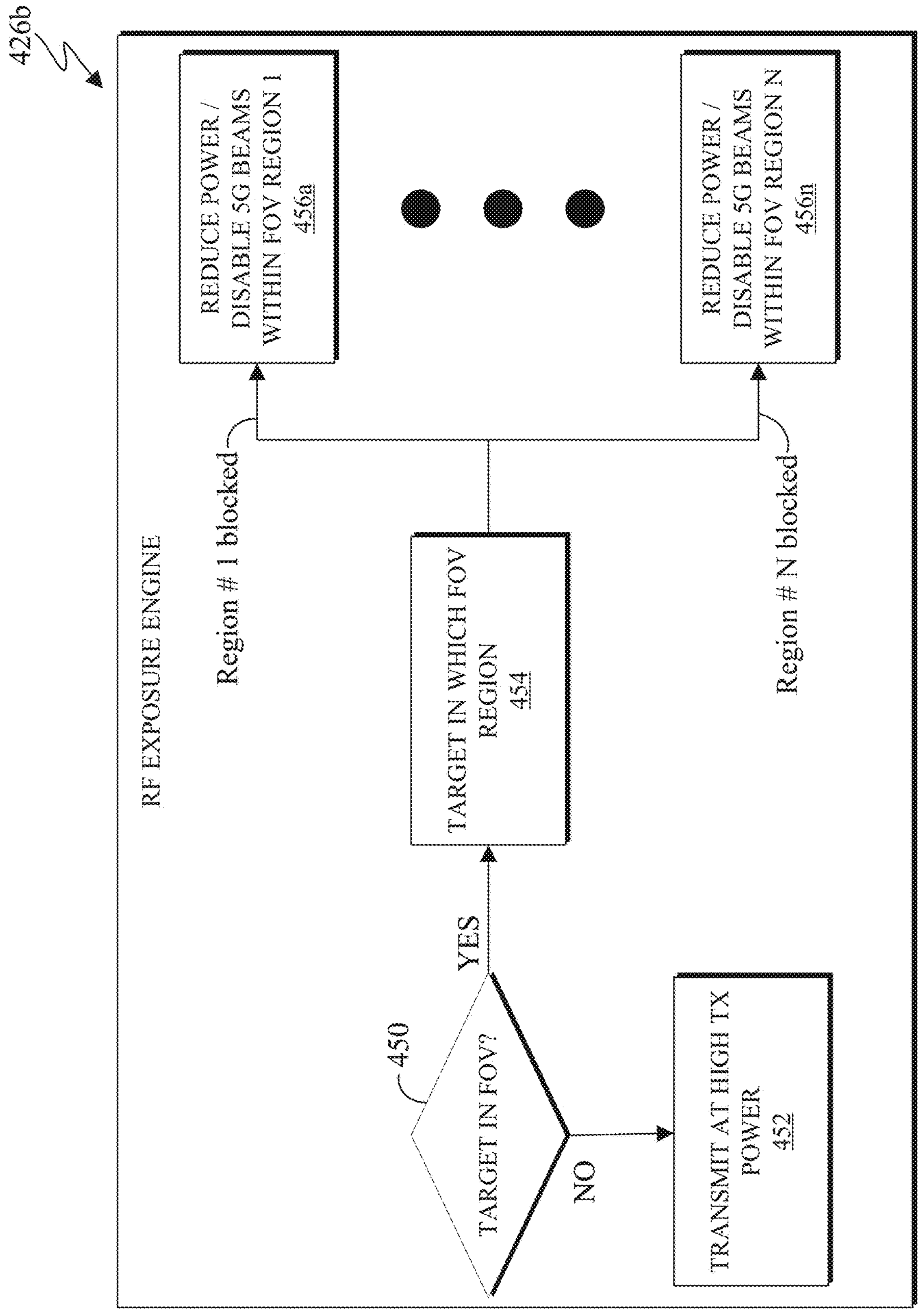

Alternatively, if the radar has good range resolution and can estimate the angle between itself and the target, the electronic device may operate using the beam level for maintaining exposure compliance. To maintain exposure compliance at the beam level, the FoV is divided into smaller FoV regions (the granularity depends on the angle resolution of the radar and expected target size). Maintaining exposure compliance at the beam level is similar to the communication interface level, with the exception that at the beam level, when a target is detected within a particular FoV region, the electronic device adjusts the transmit power for the affected beams belonging to that FoV region, instead of the entire communication interface. FIGS. 4A, 4C, and 4D, described below, illustrate maintaining exposure compliance at the communication interface level (such as in FIG. 4C) or the beam level (such as in FIG. 4D).

Embodiments of the present disclosure take into consideration that the regulatory bodies limit exposure due to such health concern with respect to a human body and not inanimate objects. Accordingly, embodiments of the present disclosure describing estimating RF exposure level can be based on radar detection results and a selected communication transmission configuration (TX power, selected beam, and the like). Such information of the estimate of the exposure could be used to select communication TX configuration that is strong to support high data rate link, while not exceeding any exposure limit.

Embodiments of the present disclosure describe systems and methods for estimating exposure level using radar, where the radar may have different hardware constraints such as the radar FoV and its capabilities (such as angle estimation capability, transmission timing structure, and the like). Exposure levels can be computed by averaging the exposure metric over some duration of time. For example, according to current FCC regulations, the time duration is four seconds for high frequency. As such, the first step to estimating RF exposure is to be able to know the status of the exposure in any averaging window.

Embodiments of the present disclosure also describe using a time-lapse-like radar detection for estimating the exposure level. This allows an electronic device to use a long radar processing (e.g., covering a duration of seconds) duration for detecting body parts when the human user is staying still. In such a case, the detection of body part is based on detecting some involuntary muscle movement of the body part. That is, long radar processing, can be used to distinguish between a human body part and an inanimate object, such as a table. One way to distinguish body part from other objects (such as inanimate objects) is to rely on movement. For example, there are always some micro-movement of the live body (such as breathing cycles or some other involuntary muscle activities). While micro-movements are a good identifier of a human body, it can be quite challenging to reliably detect these minor movements in a static setting as it may require a very long radar frame duration. Using a very long radar frame duration results in a time-lapse radar image, which can be interpreted as the worst case estimate of the target location (from the exposure perspective) within the long radar processing frame duration.

Embodiments of the present disclosure further describe using overlapping radar processing frames as a way to increase robustness. Introducing overlap means that radar signals could be accounted for twice. This can be interpreted as conservative radar target detection, which provides additional safety margin for RF exposure management purposes.

Additionally, embodiments of the present disclosure describe handling radar misdetection when the radar configuration cannot support very reliable detectability. This can occur due to some implementation constraint preventing the electronic device from using long enough radar processing frame.

Embodiments of the present disclosure also describe handling blind duration. Blind duration can occur when there are long frame-spacing of no radar signal transmission during a radar transmission frame timing structure.

Embodiments of the present disclosure further describe how to use angle information for RF exposure estimation.

A worst-case power density estimation can be performed in two parts. First the electronic device estimates a worst-case power density, based on radar processing results, within an averaging window up to the present time. Second, the electronic device estimates another worst-case power density for a prediction horizon. The prediction horizon is a period of time that occurs after the present time but also within the averaging window. For the first part, the estimation may depend on the radar frame structure, the speed of a target object, or both. For the second part, the estimation may depend on the duration of the prediction horizon, the speed of a target object, or both. In certain embodiments, the prediction horizon is equal to the duration of the radar processing window or shorter than the duration of the radar processing window. In certain embodiments, radar processing results are obtained based on a single radar processing window that has a starting time that coincides with the starting time of the averaging window or is before the starting time of the averaging window.

While the descriptions of the embodiments of the present disclosure, describe a radar based system for object detection and motion detection, the embodiments can be applied to any other radar based and non-radar based recognition systems. That is, the embodiments of the present disclosure are not restricted to radar and can be applied to other types of sensors (such as an ultra-sonic sensor) that can provide both range, angle, speed measurements, or any combination thereof. It is noted that when applying the embodiments of the present disclosure using a different type of sensor (a sensor other than a radar transceiver), various components may need to be tuned accordingly.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone (such as a UE), a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100, such as wearable devices. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a measuring (or radar) transceiver.

In this example, some client devices 108-114 communicate indirectly with the network 102. For example, the mobile device 108 and PDA 110 communicate via one or more base stations 116, such as cellular base stations or eNodeBs (eNBs) or gNodeBs (gNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
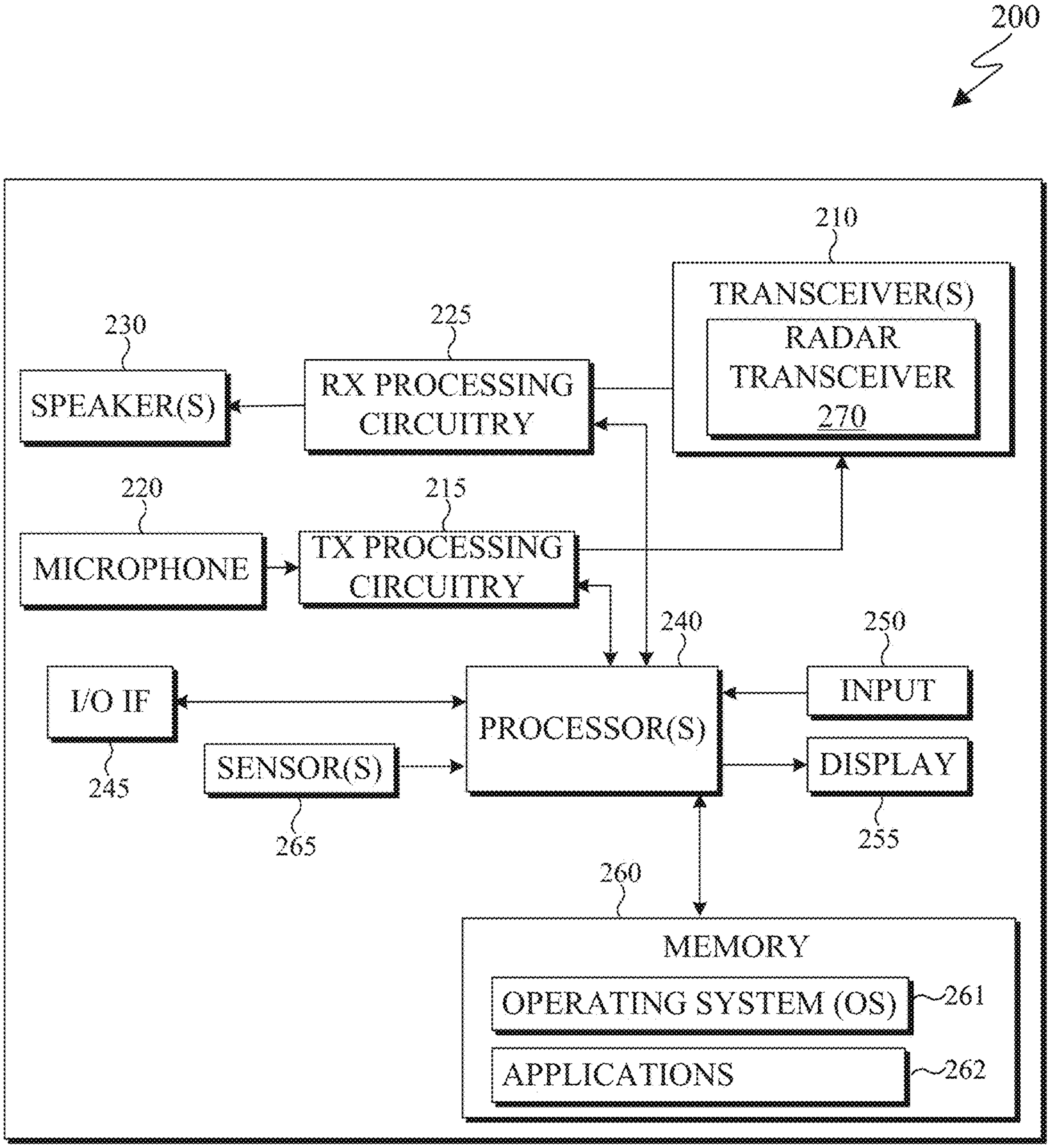
FIG. 2 illustrates an example electronic device according to embodiments of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a UE, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. For example, the transceiver(s) 210 can be equipped with multiple antenna elements. There can also be one or more antenna modules fitted on the terminal where each module can have one or more antenna elements. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, the radar transceiver 270, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

In this embodiment, one of the one or more transceivers in the transceiver 210 is a radar transceiver 270 that is configured to transmit and receive signals for detecting and ranging purposes. The radar transceiver 270 can transmit and receive signals for measuring range and speed of an object that is external to the electronic device 200. The radar transceiver 270 can also transmit and receive signals for measuring the angle of a detected object relative to the electronic device 200. For example, the radar transceiver 270 can transmit one or more signals that when reflected off of a moving object and received by the radar transceiver 270 can be used for determining the range (distance between the object and the electronic device 200), the speed of the object, the angle (angle of the object relative to the electronic device 200), or any combination thereof.

Figure 3A:
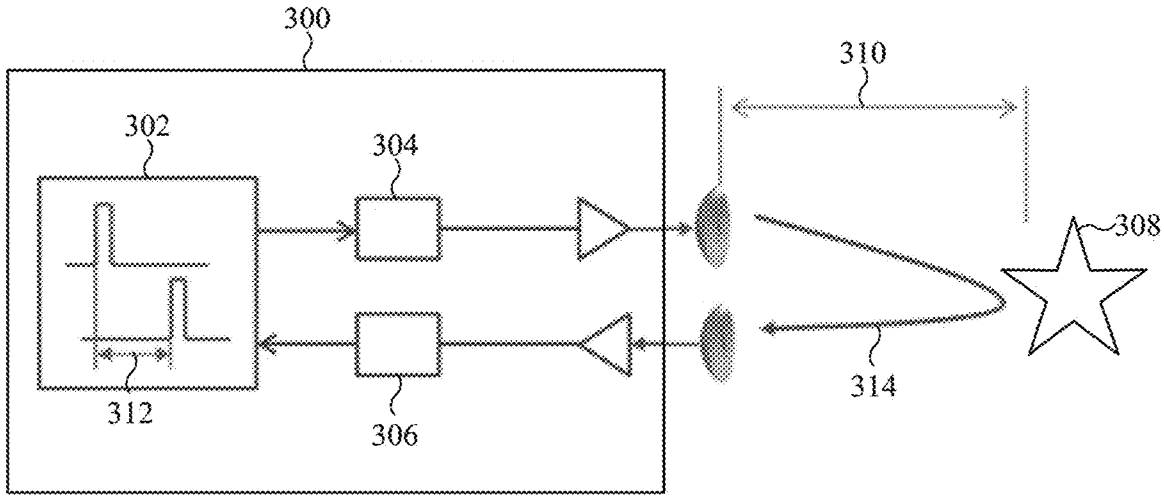
FIG. 3A illustrates an example architecture of a monostatic radar signal according to embodiments of this disclosure.

The radar transceiver 270 may be any type of transceiver including, but not limited to a radar transceiver. The radar transceiver 270 can include a radar sensor. The radar transceiver 270 can receive the signals, which were originally transmitted from the radar transceiver 270, after the signals have bounced or reflected off of target objects in the surrounding environment of the electronic device 200. In certain embodiments, the radar transceiver 270 is a monostatic radar as the transmitter of the radar signal and the receiver, for the delayed echo, are positioned at the same or similar location. For example, the transmitter and the receiver can use the same antenna or nearly-co-located while using separate, but adjacent antennas. Monostatic radars are assumed coherent, such as when the transmitter and receiver are synchronized via a common time reference. FIG. 3A, below, illustrates an example monostatic radar.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

Figure 3B:
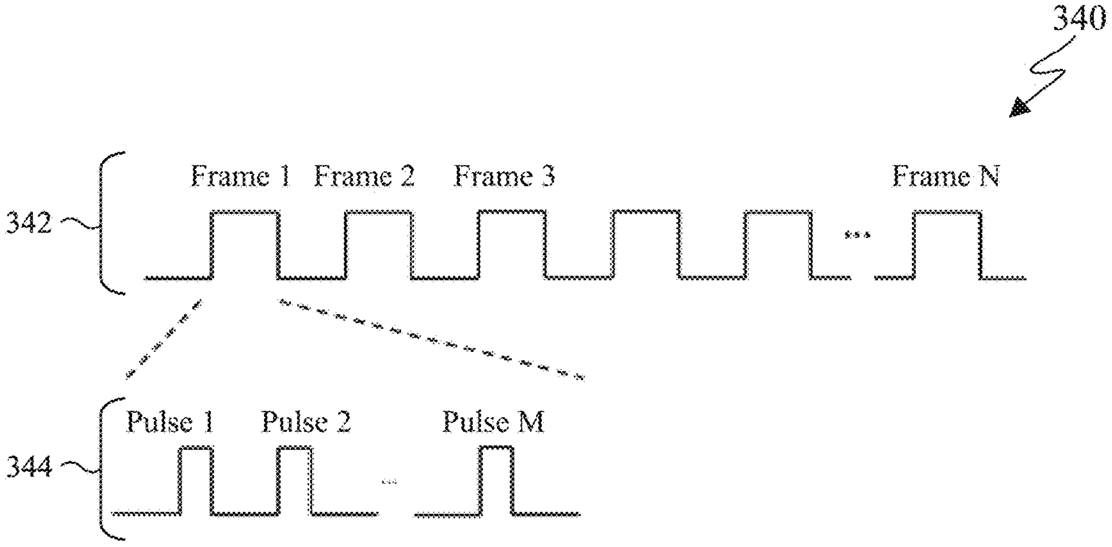
FIG. 3B illustrates an example frame structure according to embodiments of this disclosure.
Figure 3C:
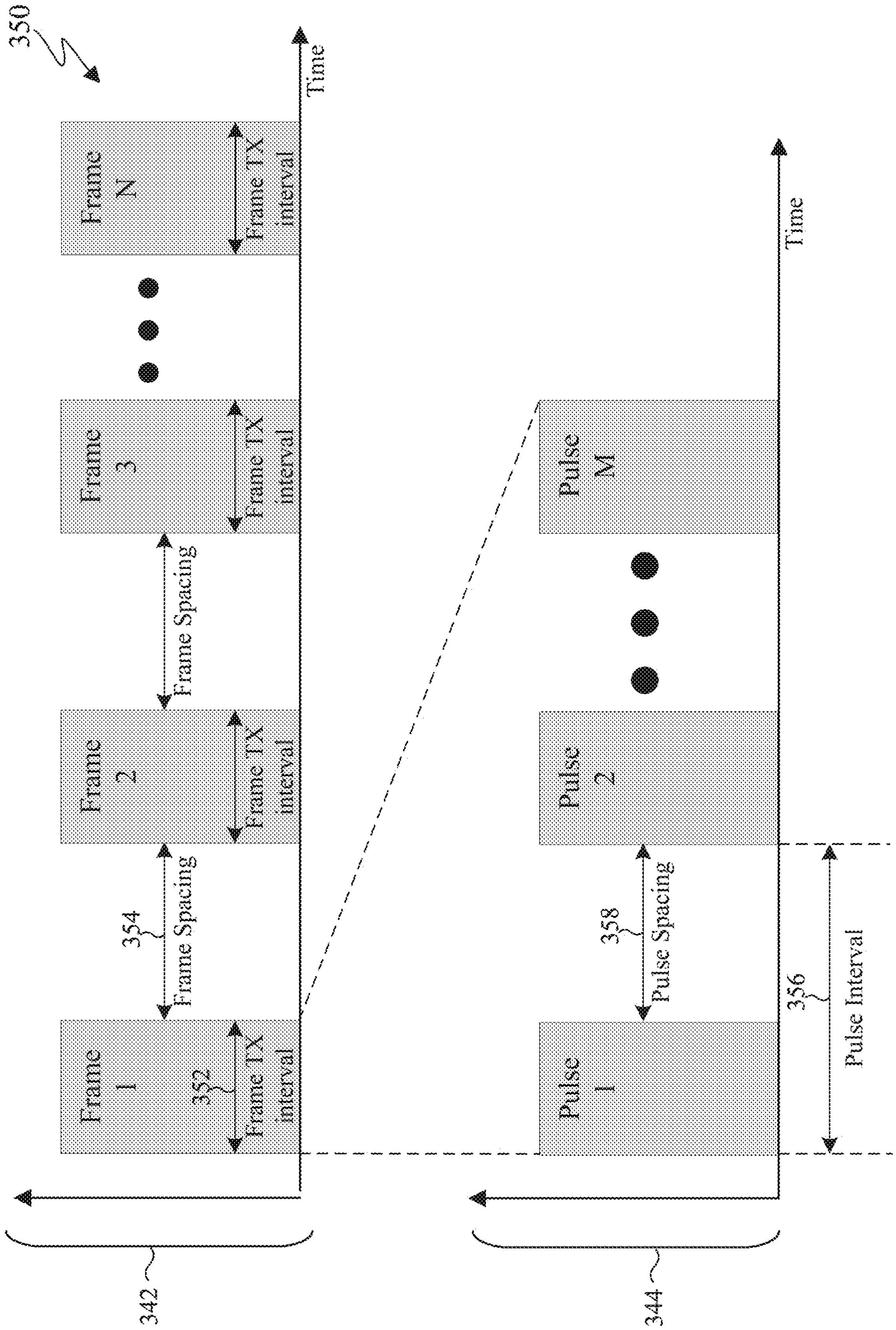
FIG. 3C illustrates an example detailed frame structure according to embodiments of this disclosure.
Figure 3D:
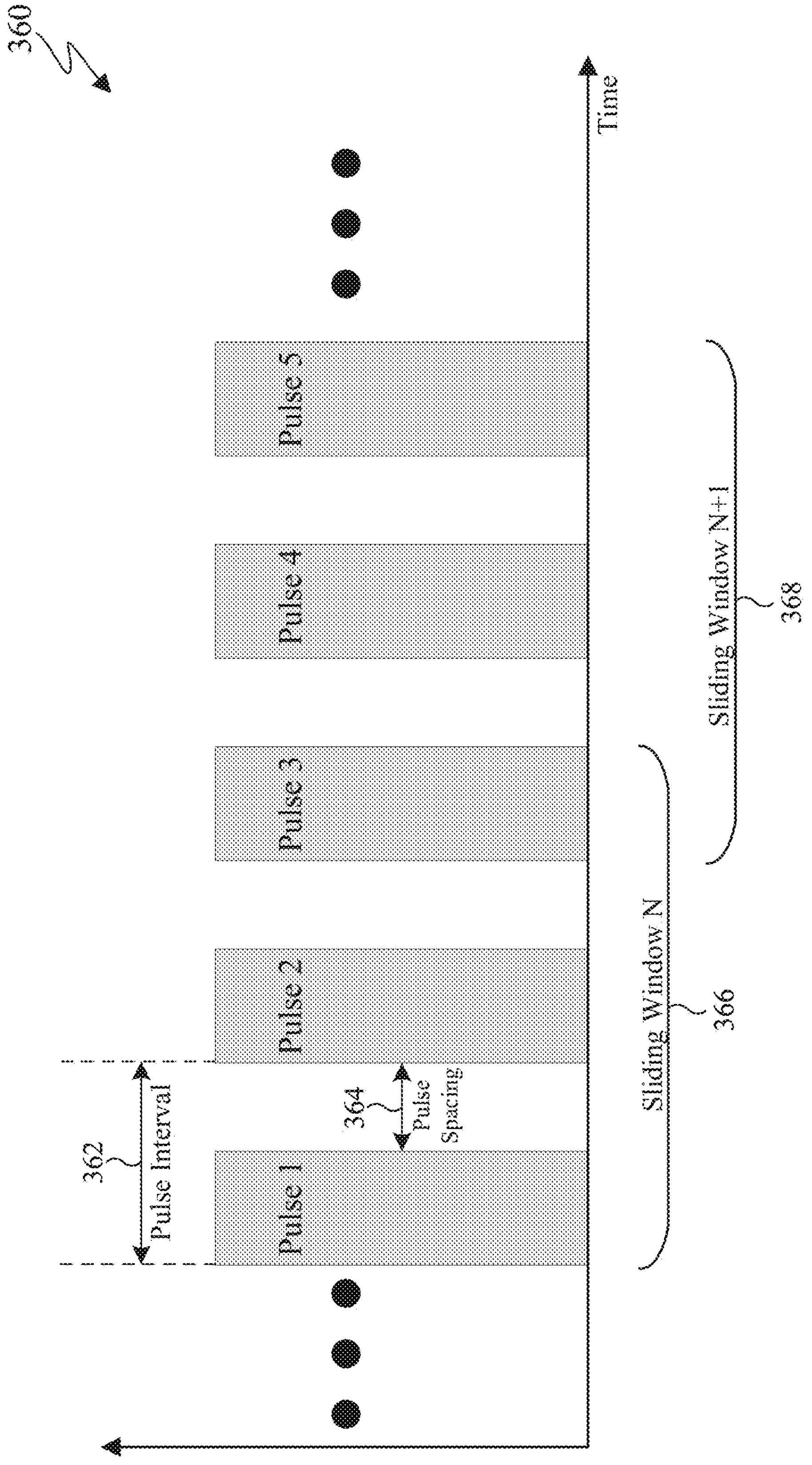
FIG. 3D illustrates example pulse structures according to embodiments of this disclosure.

FIG. 3A illustrates an example architecture of a monostatic radar in accordance with an embodiment of this disclosure. FIG. 3B illustrates an example frame structure 340 in accordance with an embodiment of this disclosure. FIG. 3C illustrates an example detailed frame structure according to embodiments of this disclosure. FIG. 3D illustrates example pulse structures according to embodiments of this disclosure. The embodiments of FIGS. 3A-3D are for illustration only and other embodiments can be used without departing from the scope of the present disclosure.

FIG. 3A illustrates an electronic device 300 that includes a processor 302, a transmitter 304, and a receiver 306. The electronic device 300 can be similar to any of the client devices 106-114 of FIG. 1, the server 104 of FIG. 1, or the electronic device 200 of FIG. 2. The processor 302 is similar to the processor 240 of FIG. 2. Additionally, the transmitter 304 and the receiver 306 can be included within the radar transceiver 270 of FIG. 2.

The transmitter 304 of the electronic device 300 transmits a signal 314 to the target object 308. The target object 308 is located a distance 310 from the electronic device 300. For example, the transmitter 304 transmits a signal 314 via an antenna. In certain embodiments, the target object 308 corresponds to a human body part. The signal 314 is reflected off of the target object 308 and received by the receiver 306, via an antenna. The signal 314 represents one or many signals that can be transmitted from the transmitter 304 and reflected off of the target object 308. The processor 302 can identify the information associated with the target object 308, such as the speed the target object 308 is moving and the distance the target object 308 is from the electronic device 300, based on the receiver 306 receiving the multiple reflections of the signals, over a period of time.

Leakage (not shown) represents radar signals that are transmitted from the antenna associated with transmitter 304 and are directly received by the antenna associated with the receiver 306 without being reflected off of the target object 308.

In order to track the target object 308, the processor 302 analyzes a time difference 312 from when the signal 314 is transmitted by the transmitter 304 and received by the receiver 306. It is noted that the time difference 312 is also referred to as a delay, as it indicates a delay between the transmitter 304 transmitting the signal 314 and the receiver 306 receiving the signal after the signal is reflected or bounced off of the target object 308. Based on the time difference 312, the processor 302 derives the distance 310 between the electronic device 300, and the target object 308. Additionally, based on multiple time differences 312 and changes in the distance 310, the processor 302 derives the speed that the target object 308 is moving.

Monostatic radar is characterized for its delayed echo as the transmitter 304 of the radar signal and the receiver 306 of the radar signal essentially are at the same location. In certain embodiments, the transmitter 304 and the receiver 306 are co-located either by using a common antenna or nearly co-located but use separate but adjacent antennas. Monostatic radars are assumed coherent such that the transmitter 304 and the receiver 306 are synchronized via a common time reference.

A radar pulse is generated as a realization of a desired radar waveform, modulated onto a radio carrier frequency, and transmitted through a power amplifier and antenna, such as a parabolic antenna. In certain embodiments, the pulse radar is omnidirectional. In other embodiments, the pulse radar is focused into a particular direction. When the target object 308 is within the field of view of the transmitted signal and within a distance 310 from the radar location, then the target object 308 will be illuminated by RF power density (W/m$^2$), $p_t$, for the duration of the transmission. Equation (1) describes the first order of the power density, $p_t$.

$$p_t = \frac{P_T}{4\pi R^2} G_T = \frac{P_T}{4\pi R^2}\frac{A_T}{(\lambda^2/4\pi)} = P_T\frac{A_T}{\lambda^2 R^2} \tag{1}$$

Referring to Equation (1), $P_T$ is the transmit power (W). $G_T$ describes the transmit antenna gain (dBi) and $A_T$ is an effective aperture area (m$^2$). λcorresponds to the wavelength of the radar signal (m), and R corresponds to the distance 310 between the antenna and the target object 308. In certain embodiments, effects of atmospheric attenuation, multi-path propagation, antenna loss and the like are negligible, and therefore not addressed in Equation (1).

The transmit power density impinging onto the target object 308 surface can cause reflections depending on the material, composition, surface shape and dielectric behavior at the frequency of the radar signal. In certain embodiments, only direct reflections contribute to a detectable receive signal since off-direction scattered signals can be too weak to be received by at the radar receiver. The illuminated areas of the target with normal vectors pointing back at the receiver can act as transmit antenna apertures with directives (gains) in accordance with their effective aperture areas. Equation (2), below, describes the reflective back power.

$$P_{refl} = p_t A_t G_t \sim p_t A_t r_t \frac{A_t}{\lambda^2/4\pi} = p_t RSC \tag{2}$$

In Equation (2), $P_{refl}$ describes the effective isotropic target-reflected power (W). The term, $A_t$, describes the effective target area normal to the radar direction (m$^2$). The term rt describes the reflectivity of the material and shape, which can range from [0, . . . , 1]. The term Gt describes the corresponding aperture gain (dBi). RCS is the radar cross section (m$^2$) and is an equivalent area that scales proportional to the actual reflecting area-squared inversely proportional with the wavelength-squared and is reduced by various shape factors and the reflectivity of the material itself. Due to the material and shape dependency, it is difficult to deduce the actual physical area of a target from the reflected power, even if the distance 310 to the target object 308 is known.

The target reflected power at the receiver location results from the reflected power density at the reverse distance 310 collected over the receiver antenna aperture area. Equation (3), below, describes the received target reflected power. It is noted that PR is the received target reflected power (W) and $A_R$ is the receiver antenna effective aperture area (m$^2$). In certain embodiments, $A_R$ is the same as $A_r$.

$$P_R = \frac{P_{refl}}{4\pi R^2} A_R = P_T \cdot RSC \frac{A_T A_R}{4\pi\lambda^2 R^4} \tag{3}$$

A radar system can be used as long as the receiver signal exhibits sufficient signal-to-noise ratio (SNR). The value of SNR depends on the waveform and detection method. Equation (4), below, describes the SNR. It is noted that kT is the Boltzmann constant multiplied by the current temperature. B is the radar signal bandwidth (Hz). F is the receiver noise factor which is a degradation of the receive signal SNR due to noise contributions of the receiver circuit itself.

$$SNR = \frac{P_R}{kT \cdot B \cdot F} \tag{4}$$

When the radar signal is a short pulse of duration or width, $T_p$, the delay or time difference 312 between the transmission and reception of the corresponding echo is described in Equation (5). τ corresponds to the delay between the transmission and reception of the corresponding echo and equal to Equation (5). c is the speed of light propagation in the air. When there are multiple targets at different distances, individual echoes can be distinguished only if the delays differ by at least one pulse width. As such, the range resolution of the radar is described in Equation (6). A rectangular pulse of a duration $T_P$ exhibits a power spectral density as described in Equation (7) and includes a first null at its bandwidth as shown in Equation (8). The range resolution of a radar signal is connected with the bandwidth of the radar waveform is expressed in Equation (9).

$$\tau=2R/c \quad (5)$$

$$\Delta R=c\Delta\tau/2=cT_p/2 \quad (6)$$

$$P(f)\sim(\sin(\pi fT_p)/(\pi fT_p))^2 \quad (7)$$

$$B=1/T_p \quad (8)$$

$$66\ R=c/2B \quad (9)$$

Depending on the radar type, various forms of radar signals exist. One example is a Channel Impulse Response (CIR). CIR measures the reflected signals (echoes) from potential targets as a function of distance at the receive antenna module, such as the radar transceiver 270 of FIG. 2. In certain embodiments, CIR measurements are collected from transmitter and receiver antenna configurations which when combined can produce a multidimensional image of the surrounding environment. The different dimensions can include the azimuth, elevation, range, and Doppler.

The speed resolution (such as the Doppler resolution) of the radar signal is proportional to the radar frame duration. Radar speed resolution is described in Equation (10), below.

$$\Delta v=\frac{\lambda}{2T_{tx-frame}} \quad (10)$$

Here, $\lambda$ is the wavelength of the operating frequency of the radar, and $T_{tx\text{-}frame}$ is the duration of active transmission (simply called the radar frame duration here) of the pulses in the radar frame.

The example frame structure 340 of FIG. 3B illustrates an example raw radar measurement. The frame structure 340 describes that time is divided into frames 342, where each frame has an active transmission period and a silence period, denoted as frame spacing. During the active transmission period, M pulses 344 may be transmitted. For example, the example frame structure 340 includes frame 1, frame 2, frame 3, through frame N. Each frame includes multiple pulses 344, such as pulse 1, pulse 2 through pulse M.

In certain embodiments, different transmit and receive antenna configurations activate for each pulse or each frame. In certain embodiments, different transmit or receive antenna configurations activate for each pulse or each frame. It is noted that although the example frame structure 340 illustrates only one frame type, multiple frame types can be defined in the same frame, where each frame type includes a different antenna configuration. Multiple pulses can be used to boost the SNR of the target or may use different antenna configurations for spatial processing.

In certain embodiments, each pulse or frame may have a different transmit/receive antenna configuration corresponding to the active set of antenna elements and corresponding beamforming weights. For example, each of the M pulses in a frame can have different transmit and receive antenna pair allowing for a spatial scan of the environment (such as using beamforming), and each of the frames 342 all repeat the same pulses.

The example frame structure 340 illustrates uniform spacing between pulses and frames. In certain embodiments, any spacing, even non-uniform spacing, between pulses and frames can be used.

Long radar frames can be used to generate reliable detection of an object even when there is only minor and weak movement, since there is a higher chance that movement will occur during a long frame. To minimize the cost of using long radar frames, embodiments of the present disclosure describe processing multiple radar frames to increase the radar observation time while keeping the same or similar effective radar transmission cycle.

FIG. 3C illustrates an example detailed frame structure 350 according to embodiments of this disclosure. The detailed frame structure 350 includes frames 342 and pulses 344, which can be similar to the frames 342 and pulses 344 of FIG. 3B.

The detailed frame structure 350 includes multiple frames such as the frame N and multiple pulses such as the pulse M. Each frame, such as frame N, has a specific transmission interval 352. Similarly each of the frames are separated by a frame spacing interval, such as the frame spacing interval 354. The frame spacing interval, such as the frame spacing interval 354 can be the same or a different time than frame spacing interval between the frame 1 and the frame 2.

In certain embodiments, the transmission interval 352 of a frame is shorter than the frame spacing interval 354. For example, the transmission interval 352 of a frame can be 0.2 seconds for each of the frames (such as frame N) and the frame spacing interval 354 can be 0.8 seconds. In this example, when processing two consecutive frames the effective radar frame increases to 1.2 seconds (the duration of two of the frames which have a transmission interval of 0.2 seconds each, and the frame spacing interval of 0.8 seconds), while the actual radar transmission remains the same. Similarly, when processing three consecutive frames the effective radar frame increases to 2.2 seconds (the duration of three of the frames which have a transmission interval of 0.2 seconds each, and two frame spacings intervals which are 0.8 seconds each), while the actual radar transmission remains the same.

Each frame, such as the frame 1 can have one or more pulses. When a frame has more than two pulses, the pulses are separated by a pulse spacing 358. The pulse spacing interval, such as the pulse spacing interval 358 can be the same or a different time than pulse spacing interval between the pulse 1 and the pulse 2. A pulse interval such as a pulse interval 356, is the time of transmission of one pulse and the subsequent pulse space. For example, the pulse interval 356 is the transmission interval of pulse 1 and the pulse spacing 358.

When the frame spacing is different than the pulse spacing is denoted as a first radar timing structure. FIG. 3D, describes a second radar timing structure which occurs when the frame spacing is the same as the pulse spacing.

The pulse structure 360 of FIG. 3D illustrates a special case of a frame structure. The pulse structure 360 illustrates the frame spacing as being the same as the pulse spacing 364. In this embodiment, there is no actual physical boundaries between the frames. This timing structure allows sliding window processing where the stride (how often to do the processing) could be selected accordingly. An illustrative example for sliding window 366 and 368 of three pulses with a stride of two is shown in FIG. 3D. This frame structure is denoted as the second radar timing structure below.

Using variable spacing between pulses and/or frames can increase flexibility and provide coexistence with other systems. For example, consider a 5G system setting, the radar may be constrained by the 5G scheduler on when the radar could operate. By allowing variable spacing, the radar can transmit whenever allowed or not impacting the 5G scheduled time. For another example, consider a WiFi-like system that implements a carrier sensing-based solution. In such a case, the availability of the medium is unknown a priori. The transmitter would have to first listen for transmission in the medium before it can transmit. This kind of uncertainty makes it difficult to guarantee uniform sampling of the pulses and/or frames.

Although FIGS. 3A-3D illustrate electronic device 300 and radar signals, various changes can be made to FIGS. 3A-3D. For example, different antenna configurations can be activated, different frame timing structures can be used or the like. FIGS. 3A-3D do not limit this disclosure to any particular radar system or apparatus.

FIG. 4A illustrates a diagram 400 of an electronic device with multiple field of view regions corresponding to beams according to embodiments of this disclosure. FIG. 4B illustrates a signal processing diagram 420 for controlling radio frequency (RF) exposure according to embodiments of this disclosure. FIGS. 4C and 4D illustrate processes **426*a* and 426*b*, respectively, for RF level exposure modifications according to embodiments of this disclosure. The embodiments of the diagram 400, the signal processing diagram 420, the process 426*a*, and the process 426*b*** are for illustration only. Other embodiments can be used without departing from the scope of the present disclosure.

The diagram 400, as shown in FIG. 4A illustrates an electronic device 410. The electronic device 410 can be similar to any of the client devices 106-114 of FIG. 1, the server 104 of FIG. 1, the electronic device 200 of FIG. 2, or the electronic device 300 of FIG. 3A.

The electronic device 410 can include one or more mmWave antenna modules or panels. As illustrated, the electronic device 410 includes two mmWave antenna modules or panels, one located on the right side (corresponding to regions **415*a*, 415*b*, and 415*c*) while the other is located on the left side (corresponding to regions 415*d*, 415*e*, and 415*f*). Other electronic devices can include less or more mmWave antenna modules or panels, such as a single mmWave antenna module or panel. The electronic device 410 can transmit multiple beams corresponding to various regions such as the regions 415*a*, 415*b*, 415*c*, 415*d*, 415*e*, and 415*f* (collectively regions 415**). Each beam has a width and a direction.

An RF exposure engine, such as the RF exposure engine 426 of FIG. 4B, can maintain exposure compliance while minimizing the opportunity loss for communication beamforming operations. One way to achieve such RF exposure control is for the device to be able to know whether there is exposure risk (or whether there is no exposure risk) based on detecting whether there is a body part of a human nearby within one or more of the FoV regions of the antennas or not.

The signal processing diagram 420 illustrates an example process for controlling RF exposure. The signal processing diagram 420 includes several information repositories, including a radar detection results 424, a transmission margin 428, and transmission configuration history 432. These information repositories can be similar to or included within the memory 260 of FIG. 2. The signal processing diagram 420 also includes a radar transceiver 422, which can be similar to the radar transceiver 270 of FIG. 2. The signal processing diagram 420 further includes transceiver 430 which can be similar to the transceiver 210 of FIG. 2.

The radar transceiver 422 transmits and receives radar signals. The received radar signals are used to detect objects which are stored in the radar detection results 424. The electronic device logs any detected results in the radar detection results 424. The transceiver 430 logs its adopted transmission configuration such as the transmit power, the beam index used, the duty cycle and the like to the TX configuration history 432. Based on (i) whether an object is detected (as indicated in the radar detection results 424) and (ii) previous RF exposure levels (as indicated in the TX configuration history 432) the RF exposure engine 426 estimate the worst case RF exposure and derive the transmission margin 428. The transmission margin 428 is a level of RF transmission that would not lead to RF exposure violation, which occurs when a user is exposed to RF above the margin.

It is noted that the update rate of the TX configuration and the radar detection may not be the same. For example, the update rate of the TX configuration could be almost instantaneous (or can practically assume so), while radar detection could be done sporadically due to the constraint on the radar transmission and/or the computational cost for running the radar detection procedure.

As discussed above, the RF exposure engine 426 can control RF exposure based on a communication interface level or a beam level based on radar capability. For example, if the radar cannot detect angle (such as when the electronic device has a single antenna) or lacks enough resolution, the RF exposure engine 426 may operate according to the communication interface level RF exposure management, illustrated in FIG. 4C. If the radar has good range resolution and can estimate the angle of the object, the RF exposure engine 426 may operate according to the beam level RF exposure management, illustrated in FIG. 4D.

FIG. 4C illustrates the process **426*a* for the RF exposure engine 426 of FIG. 4B to derive the transmission margin 428** to prevent RF exposure over a predefined limit regarding a communication interface level RF exposure.

For communication interface level RF exposure management, the RF exposure engine 426, in step 440 determines, whether a target is within the FoV. The target can be a human body part. The FoV can include multiple regions on one side of the electronic device 410, such as the regions **415*a*-415*c*. When the electronic device does not detect an object within the region 415*a*-415*c* (based on the results from the radar transmission), the RF exposure engine 426 in step 442 can notify the mmWave communication interface, (such as the transceiver 210 of FIG. 2 or the transceiver 430 of FIG. 4B) that it can use a high TX power. Alternatively, when the electronic device detects an object that is classified as a human body part (based on the results from the radar transmission and movement of the object), that is within the area defined by the region 415*a*-415*c*, then the RF exposure engine 426 in step 444 notifies the mmWave communication interface, (such as the transceiver 210 of FIG. 2 or the transceiver 430 of FIG. 4B**) so that mmWave communication interface may reduce the transmit power, revert to using less directional beam, or abort the transmission altogether if the exposure risk is too eminent.

FIG. 4D illustrates the process **426*b* for the RF exposure engine 426 of FIG. 4B to derive the transmission margin 428** to prevent RF exposure over a predefined limit regarding a beam level RF exposure.

For the beam level RF exposure management, the FoV of the communication interface level RF is divided into smaller FoV regions (the granularity depends on the angle resolution of the radar and expected object (target) size), such as the region **415*a*. The operation is the same as the communication interface level operation, with the exception that here only when a target is detected within a particular FoV region, such as the region 415***a* that the RF exposure engine 426 would make adjustment for the affected beams belonging to that FoV region.

For example, the RF exposure engine 426, in step 450 determines whether a target is within the FoV. The FoV can correspond to different beams illustrated by the different regions 415. When the electronic device does not detect an object (or detects an object that is determined to not be a human body part), the RF exposure engine 426 in step 452 can notify the mmWave communication interface, (such as the transceiver 210 of FIG. 2 or the transceiver 430 of FIG. 4B) that is it can use a high TX power. Alternatively, when the electronic device detects an object, that is classified as a human body part, the electronic device determines, in step 454, which region the object is within. Based on which of the one or more regions 415*a*-415*f* are blocked, the RF exposure engine 426 in step 456*a*-456*n*, notifies the mmWave communication interface, (such as the transceiver 210 of FIG. 2 or the transceiver 430 of FIG. 4B) so that mmWave communication interface may reduce the transmit power to the particular region, revert to using less directional beam in the particular region, or abort the transmission altogether if the exposure risk is too eminent. For example, if the hand of the user is detected in the region 415*a* and no object is detected in the regions 415*b*-415*f*, then the mmWave communication interface may reduce the power or disable the 5G beams within the region 415*a* while maintaining a higher transmit power in the regions 415*b*-415*f* without risking any exposure concerns to the user.

Although FIGS. 4A-4D illustrates the electronic device 410, the signal processing diagram 420, and the processes 426*a* and 426*b*, various changes can be made to FIG. 4A-4D. For example, any number of antennas can be used to create any number of regions. FIGS. 4A-4D does not limit this disclosure to any particular radar system or apparatus.

Figure 5A:
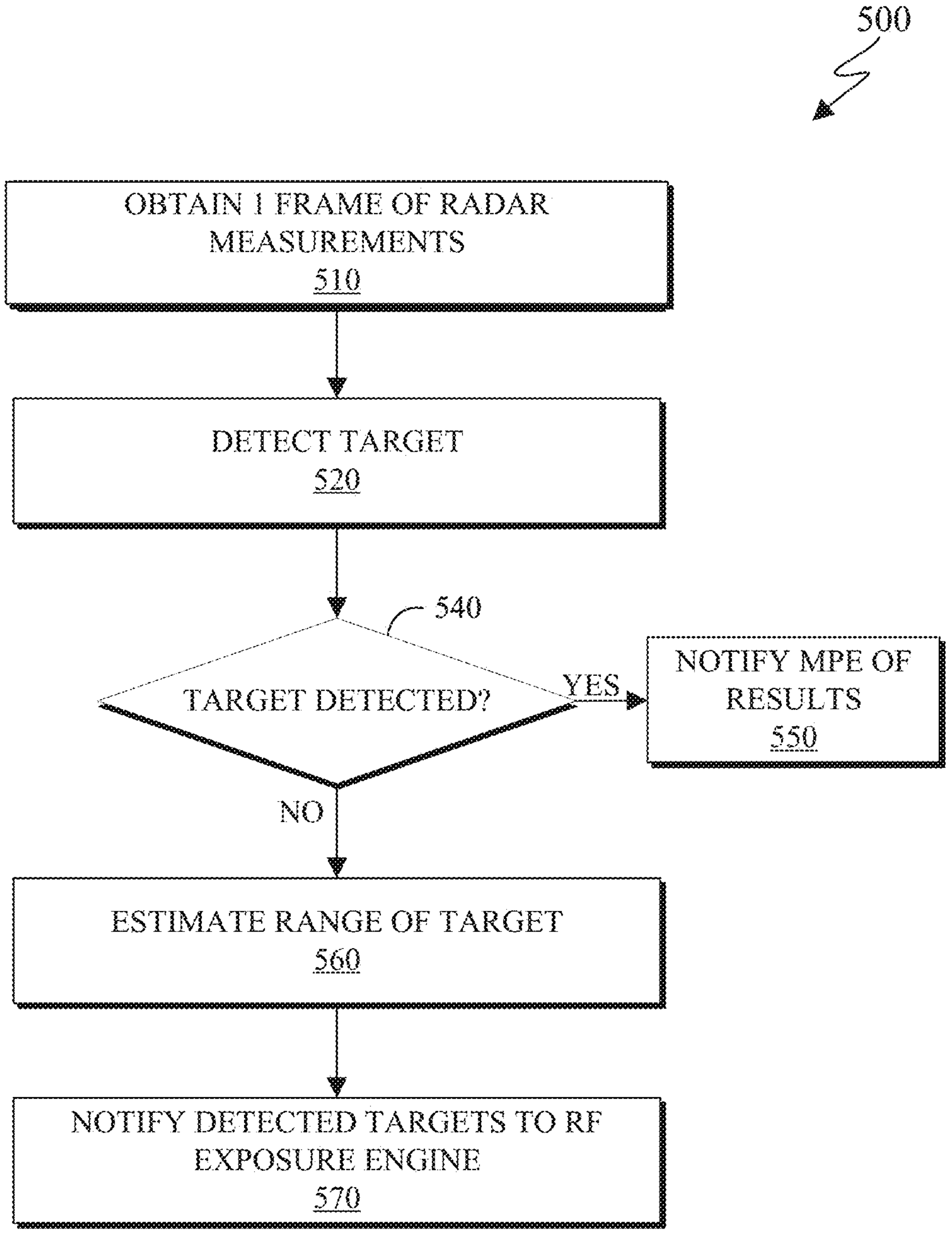
FIG. 5A illustrates a method for beam level exposure management based on object detection according to embodiments of this disclosure.
Figure 5B:
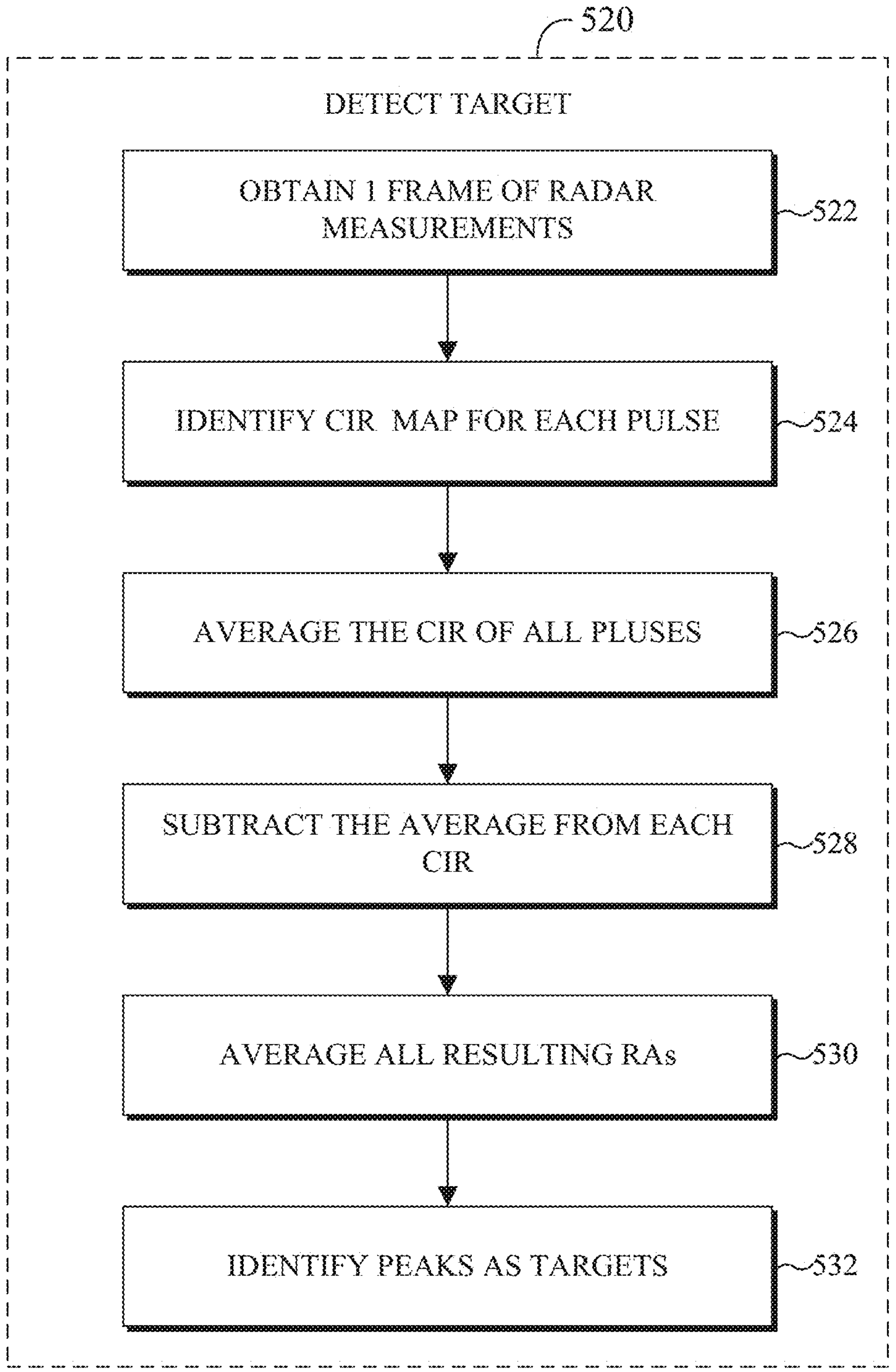
FIG. 5B illustrates a method for object detection according to embodiments of this disclosure; for object detection.
Figure 5C:
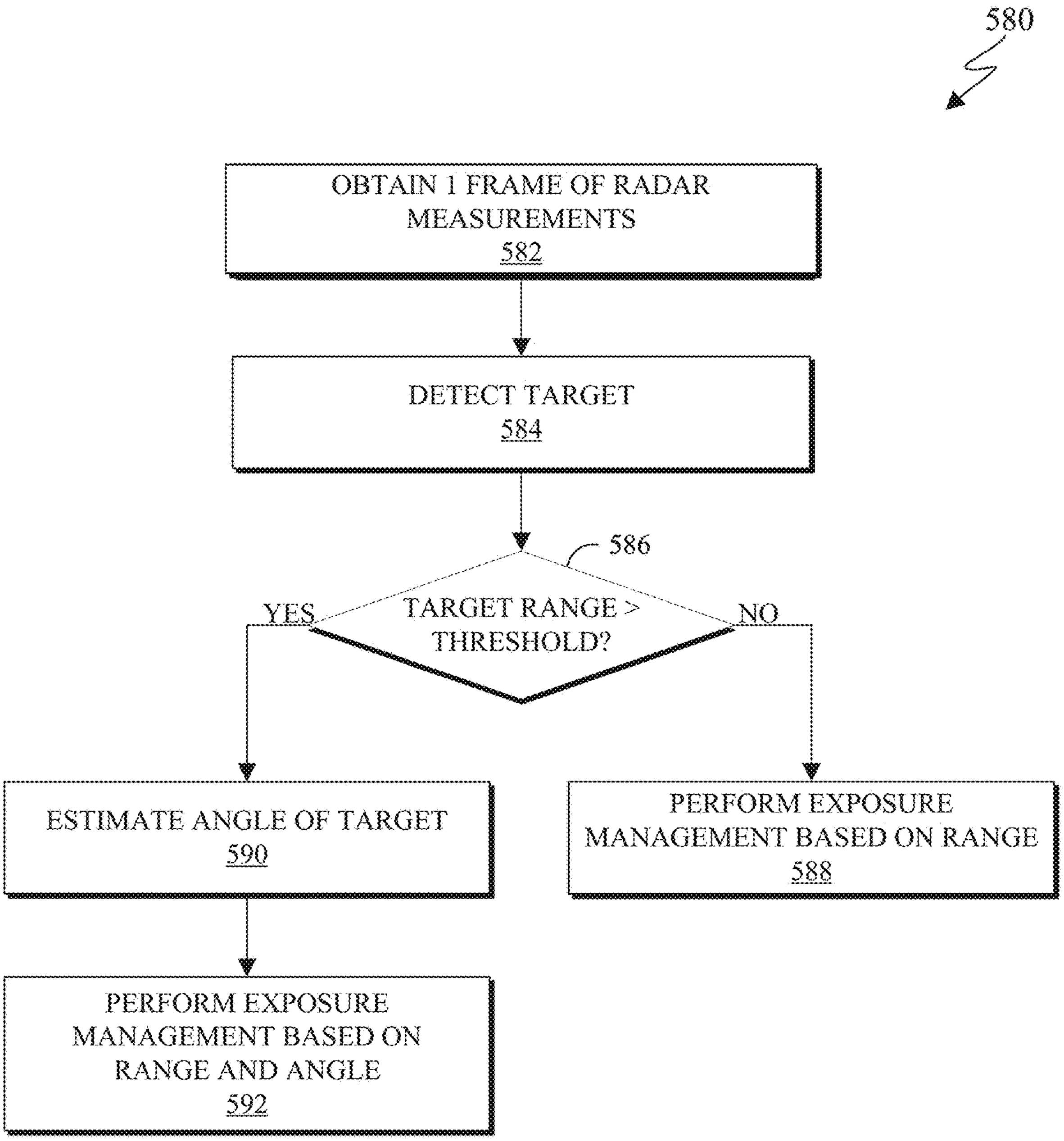
FIG. 5C describes a method for RF exposure estimation based on the targets range.
Figure 5D:
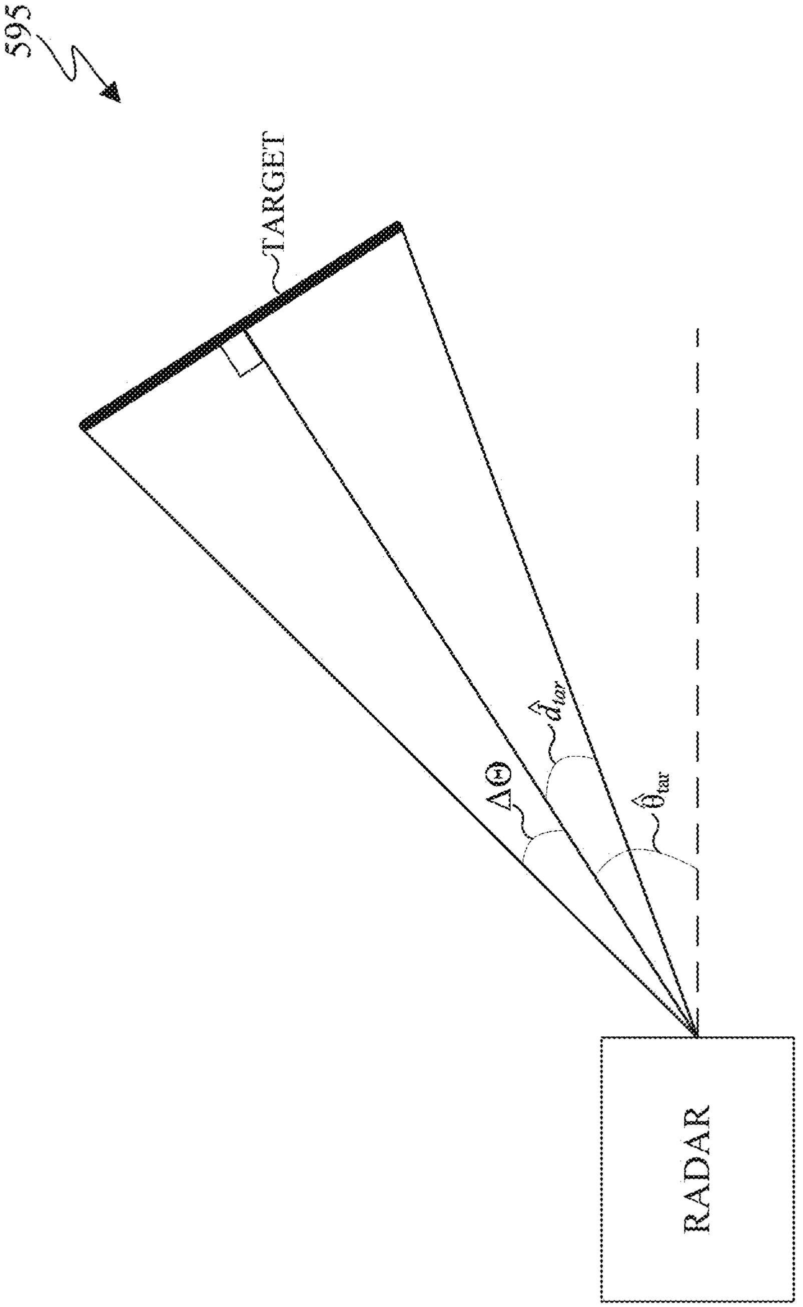
FIG. 5D illustrates an example diagram describing an identification of an uncertainty of an angle relative to a target according to embodiments of this disclosure.

FIG. 5A illustrates a method 500 for beam level exposure management based on object detection according to embodiments of this disclosure. FIG. 5B illustrates a method for object detection from step 520 of FIG. 5A according to embodiments of this disclosure. for object detection. FIG. 5C describes a method 580 for RF exposure estimation based on the targets range. FIG. 5D illustrates an example diagram 595 describing an identification of an uncertainty of an angle relative to a target according to embodiments of this disclosure. The method 500 is described as implemented by any one of the client device 106-114 of FIG. 1, the server 104 of FIG. 1, the electronic device 300 of FIG. 3A the electronic device 410 of FIG. 4A and can include internal components similar to that of electronic device 200 of FIG. 2. However, the method 500 as shown in FIG. 5A could be used with any other suitable electronic device and in any suitable system, such as when performed by the electronic device 200.

For ease of explanation, FIGS. 5A, 5B, 5C, and 5D are described as being performed by the electronic device 200 of FIG. 2.

The embodiments of the method 500 of FIG. 5A, the method of FIG. 5B, the method 580 of FIG. 5C, and the diagram 595 of FIG. 5D are for illustration only. Other embodiments can be used without departing from the scope of the present disclosure.

The method 500 of FIG. 5A describes processing a single radar frame. The method 500 first determines whether there is an object such as a human body part within the FoV of the radar, and then determines the ranges and angles of each detected human body part for adjusting the RF exposure level relative to the location of the detected human body part. The method 500 is described as being performed once per radar frame interval, however depending on the application requirements, system constraint, or the like, it could be desirable to select a different processing interval than the radar frame interval. For example, the processing could be performed once per N radar frames.

In step 510, the electronic device 200 obtains radar measurements. Radar measurements are obtained based on a radar transceiver (such as the radar transceiver 270 of FIG. 2) transmitting radar signals and receiving reflections of the radar signals. In certain embodiments, the radar measurements are obtained from an information repository (such as the memory 260 of FIG. 2) which stores previously derived radar measurements.

In step 520, electronic device 200 performs a radar detection to detect an object from the radar measurements. Step 520 is described in detail in FIG. 5B, below. In step 540, the electronic device 200 determines whether an object is detected. If no object is detected (or the detected object is not a human body part), then the electronic device 200 declares that no object is detected, which is provided to the RF exposure engine 426 of FIG. 4B (step 570).

Alternatively, if a human body part is detected (as determined in step 540), the electronic device 200 estimates the range of the object (step 560). For example, if there is at least one object detected, the range of each object is identified. All detected objects along with their attributes (ranges) are provided to the RF exposure engine 426 of FIG. 4B (step 570). The RF exposure engine 426 can reduce the transmission power, duty cycle, or abort the transmission altogether for certain beams that correspond to the angle(s) of the detected objects. The RF exposure engine 426 can use other beam directions corresponding to regions where the object is not detected without exposure risk.

FIG. 5B describes the step 520 of FIG. 5A in greater detail. In particular, FIG. 5B describes target detection based on single-frame processing. Moreover, FIG. 5B describes detecting a moving object corresponding to a human body part.

In step 522, the electronic device 200 obtains measurements from one radar frame. The step 522 can obtain the radar measurements from step 510 of FIG. 5A. In step 524, the electronic device 200 processes the radar frame to identify the CIR. For example, the raw radar measurements are processed (pulse-compression or taking fast-Fourier transform (FFT) for Frequency Modulated Continuous Wave (FMCW) radar) to compute the CIR also known as range FFT for FMCW radar, whose amplitude is the RA map. The RA map is a one dimensional signal that captures the amplitude of the reflected power from the reflectors in the FoV of the radar for a finite set of discrete range values (denoted as range tap or tap). This CIR is computed for each pulse separately.

In step 526, the electronic device 200 averages the CIRs from all the pulses within the radar frame to generate the zero-frequency (DC) component as measured by the current processed radar frame. The DC component is the estimate of the reflection from all static objects within the radar's FoV. These static reflections include the leakage (the direct transmission from the radar TX to the radar RX and other reflections off the parts of the radar equipped device) as well as other static objects (relative to the radar) not part of the device housing the radar.

In step 528, the electronic device 200 removes (subtracts) the DC component from each pulse. In step 530, the electronic device 200 averages all resulting RA's to identify the amplitude of each range tap and averaged across all the CIRs. The resulting output is called the range profile, which provide a measure of the amplitude of non-static objects within the radar's FoV for each range tap.

In step 532, the electronic device 200 performs the object detection using the range profile by identifying the peaks of the range profile as targets. For example, the electronic device 200 detects the peaks in the range profile and compares the value at the peak with a detection threshold. The detection threshold can be set according to the noise floor at the particular range tap. For example, the threshold can be set to some number of times the power of the noise floor (such as 3 dB or twice the power of the noise floor). This threshold could be selected to balance misdetection and false alarm rate.

It is noted that the objects being detected in FIG. 5B are non-static objects. The objective of FIG. 5B is to detect a body part of a human to avoid causing risky RF exposure to the human.

As described above, body parts of a live human can be expected to possess some movements at all times. The movement can be typical body movement (such as intentional hand movement such as grabbing or reaching for something or some unintentional ones such as micro movement caused by the muscle reflexes, and the like). Some of the micro movements could be difficult to see visually because of the minor and weak nature of those movements. For radar the sensitivity of the detection of such movement depends on the observation time of the radar signals (which is the radar frame duration in our case). For example, the longer the frame duration is the more sensitive the radar is to the minor movement. Accordingly, the objects being detected as described in FIG. 5B are non-static objects in order to detect a body part of a human to avoid exposing the body part to RF exposure above a certain threshold.

Embodiments of the present disclosure describe quantifying the exposure level for managing the communication transmissions. Exposure level is quantified using the total exposure ratio that includes both the exposure at low and high frequencies (e.g., 'low' means below 6 GHz, and 'high' means above 6 GHz). The choice of metric for quantifying exposure depends on the operating frequency. For example, at low frequency the specific absorption rate (SAR) is used. At high frequency the PD is used. However, the embodiments of this disclosure describe operations at high frequencies where the beamforming is commonly used.

Currently, the exposure level defined in regulations and guidelines from most regulatory bodies are the PD averaged over a certain spatial area (e.g., on the body part) and over a certain duration. For example, the FCC's interim rules from 2018 specify that the PD be averaged over an area of four square centimeters for four seconds. The RF exposure engine therefore monitors the average PD as well as the exposure from lower frequency in order to comply with the regulatory limits. The difference between operation using only the high frequency and the operation using both high and low frequency simultaneously is the limit on the allowable averaged PD. Thus, within the context of this disclosure whether lower frequency is used simultaneously or not just means a change in the average PD limit and it can be assumed that this limit is known for managing the transmission of the high frequencies.

Equation (11) describes how to estimate the average PD from the radar detection results and the past communication transmissions. For the purpose of the description here, perfect radar detection without error is assumed. How to account for radar's detection/estimation error will be described in relevant embodiments. The average PD, at a conceptual level (where it is assumed that transmission configuration and the radar detection is available at all times) is described below.

$$PD_{avg}(t) = \frac{1}{T_{PD}} \int_{t-T_{PD}}^{t} PD_{ins}(\tau) d\tau \tag{11}$$

Here, $PD_{ins}(\tau)$ is the instantaneous worst case PD averaged over the area specified in the regulation (e.g., 4 $cm^2$).

It is noted that the worst case PD is the worst case in the angular domain. The worst case in the instantaneous PD is described in Equation (12), below.

$$PD_{ins}(\tau)=\max([PD_{ins}^{in\text{-}FoV}(\tau, \Gamma_{radar}(\tau), \Omega_{comm}(\tau)), PD_{ins}^{out\text{-}FoV}(\tau, \Omega_{comm}(\tau))]) \tag{12}$$

Here, $PD_{ins}^{in\text{-}FoV}(\tau, \Gamma_{radar}(\tau), \Omega_{comm}(\tau))$ is the worst case instantaneous PD within the FoV of the radar. Additionally, $PD_{ins}^{out\text{-}FoV}(\tau, \Omega_{comm}(\tau))$ is the worst case instantaneous PD outside the FoV of the radar. The notation $\Gamma_{radar}$ denotes the radar detection, and $\Omega_{comm}$ denote the transmission configuration of the communication interface. It is noted that within the FoV of the radar, the worst case PD is computed using the radar detection, while outside the radar's FoV, the worst case exposure is assumed without using the radar detection results.

For further clarity, a few examples when out-of-FoV PD estimate could be the dominating one are provided. Consider the case when there is a target at a far distance d detected within the FoV of the radar. In this case, the $PD_{ins}^{in\text{-}FoV}$ is estimated according to the estimated distance d, and $PD_{ins}^{out\text{-}FoV}$ is estimated according to the worst exposure PD such as on the device surface (usually premeasured and available in the memory of the electronic device). Since $PD_{ins}^{in\text{-}FoV}$ is decreasing with increasing d, if d is large enough, $PD_{ins}^{in\text{-}FoV}$ will eventually become smaller than $PD_{ins}^{out\text{-}FoV}$ (which does not depend on d). As another example, consider the case where the selected beam (this information is in $\Omega_{comm}(\tau)$) has its beam direction outside the radar's FoV. In that case, $PD_{ins}^{out\text{-}FoV}$ is always larger than $PD_{ins}^{in\text{-}FoV}$. More specifically, since the definition of worst case here is in the angular domain, the worst case PD equations are described in Equation (13) and Equation (14), below.

$$PD_{ins}^{in-FoV}(\tau, \Gamma_{radar}(\tau), \Omega_{comm}(\tau)) = \max_{\theta \in \Theta_{in-FoV}} PD_{ins}^{in-FoV}(\tau, \theta, \Gamma_{radar}(\theta, \tau), \Omega_{comm}(\theta, \tau)) \tag{13}$$

$$PD_{ins}^{out-FoV}(\tau, \Omega_{comm}(\tau)) = \max_{\theta \in \Theta_{out-FoV}} PD_{ins}^{out-FoV}(\tau, \theta, \Omega_{comm}(\theta, \tau)) \tag{14}$$

Here, $\Theta_{in\text{-}FoV}$ and $\Theta_{out\text{-}FoV}$ denote the set of angles within and outside the radar FoV respectively. It is noted that the transmission configuration $\Omega_{comm}(\theta, \tau)$ is dependent on the angle $\theta$ because of the use of directional beams.

Given the same target distance from the transmitter, the exposure level in the main lobe of the beam will be higher than for $\theta$ outside the mainlobe of the communication beam. It is noted that the computations of Equations (13) and (14) can be done once in the factory and saved as a lookup table indexed by the beam indices. In typical cases, the PD at some reference TX power could be scaled to compute the PD at any TX power (assuming within the range of linearity of the hardware) and thus typically there is no need to use TX power as another dimension of the lookup table (which can save some memory, such as the memory 260 of FIG. 2).

It is noted that when there are multiple targets, the exposure (the PD) could be estimated for each target and the worst one is used for exposure management purpose. If the closest target is below a threshold distance, then only the range information is used for exposure management (i.e., using EQUATION (13) for estimating the worst case PD).

As described above, the angle between the electronic device and the target can be estimated. In certain embodiments, the radar transceiver (such as the radar transceiver 270) may have multiple receive antennas. The measurements from the various pulses of the radar transmission could be combined to estimate the spatial covariance matrix at the detected target, which could be used to estimate the angle of arrival of the target (which is the angle of the target relative to the radar). The target angle estimate provides additional information to limit its spatial location and can be used to better estimate the exposure level especially when using directional beams (commonly used solution for 5G millimeter wave).

FIG. 5C describes a method 580 for RF exposure estimation based on the targets range. In step 582, the electronic device 200 obtains radar measurements. Radar measurements are obtained based on a radar transceiver (such as the radar transceiver 270 of FIG. 2) transmitting radar signals and receiving reflections of the radar signals. In certain embodiments, the radar measurements are obtained from an information repository (such as the memory 260 of FIG. 2) which stores previously derived radar measurements.

In step 584, electronic device 200 performs a radar detection to detect an object from the radar measurements. Step 584 is described in detail in FIG. 5B, above. In certain embodiments, after obtaining the radar signals (step 582), the closest target is detected, and the range of the target is estimated.

In step 586, the electronic device 200 determines whether an estimated range between the electronic device and the object is larger than a predefined threshold (or threshold range). In certain embodiments, the threshold is between five centimeters and ten centimeters. In other embodiments the threshold is smaller than 5 centimeters. In yet other embodiments, the threshold is larger than 10 cm.

Upon determining that the range is less than the threshold (as determined in step 586), the electronic device in step 588 provides the range to the RF exposure engine 426 of FIG. 4A (step 586). Alternatively, upon determining that the range is larger than the threshold (as determined in step 586), the electronic device in step 590 performs angle estimation. The angle and the range are then provided to the RF exposure engine 426 of FIG. 4A (step 592). The RF exposure engine 426 (upon receiving the range, of step 588 or both the range and angle, in step 592) can reduce the transmission power, duty cycle, or abort the transmission altogether for certain beams that correspond to the angle(s) of the detected objects. The RF exposure engine 426 can use other beam directions corresponding to regions where the object is not detected without exposure risk.

To perform exposure management with angle information, the PD calculation of Equation (13) could be modified as described in Equation (15), below.

$$PD_{ins}^{in\text{-}FoV}(\tau, \Gamma_{radar}(\tau), \Omega_{comm}(\tau)) = \max_{\theta \in \Theta_{Tar}} PD_{ins}^{in\text{-}FoV}(\tau, \theta, \Gamma_{radar}(\theta, \tau), \Omega_{comm}(\theta, \tau)) \quad (15)$$

Note that the difference between Equation (15) and Equation (13) is in the range of value of θ when doing the max operation. Instead of taking the maximum over all the angle in the FoV of the radar, $\Theta_{in\text{-}Fov}$, the maximum is searched in a more limited angle range corresponding to the detected target $\Theta_{Tar}$.

It is noted that because the target (body part) is expected to have non-negligible size compared to the distance between the target and the radar, it cannot be treated as a point source, and it is desirable to consider an angle range such as $\Theta_{Tar}$ instead of just a single angle value. One way to define $\Theta_{Tar}$ could be to place some uncertainty range of the values in the estimated angle. For example, let $\hat{\theta}_{Tar}$ be the estimated target angle (a single value), then $\hat{\theta}_{Tar}$ is defined in Equation (16), below.

$$\Theta_{Tar} = [\hat{\theta}_{Tar} - \Delta\Theta, \hat{\theta}_{Tar} + \Delta\Theta] \quad (16)$$

Here, ΔΘ is the uncertainty range, and it is chosen to cover the target of interest at the closest range defined by the threshold used in the method 580 of FIG. 5C.

In another approach, the target size can be assumed (more precisely the size along the angle dimension estimated by the radar) and use the target distance along with that assumed size to determine the uncertainty interval. For example, if a hand is a typical target of interest, a reasonable assumed size could be somewhere in between ten and twenty centimeters. Then, ΔΘ could be derived by computing the angle from both ends of the assumed target size using that size, the target estimated distance and angle. This is illustrated in the diagram 595 of FIG. 5D. It is noted that to assume the maximum uncertainty range from the radar for the assumed target size, the target should be oriented perpendicular to the radial direction from the radar as shown in FIG. 5D.

Although FIGS. 5A, 5B, 5C, and 5D illustrate examples for detecting a moving object and estimating its location for RF exposure management various changes may be made to FIGS. 5A, 5B, 5C, and 5D. For example, while shown as a series of steps, various steps in FIG. 5A, FIG. 5B, or FIG. 5C could overlap, occur in parallel, or occur any number of times.

Figure 6A:
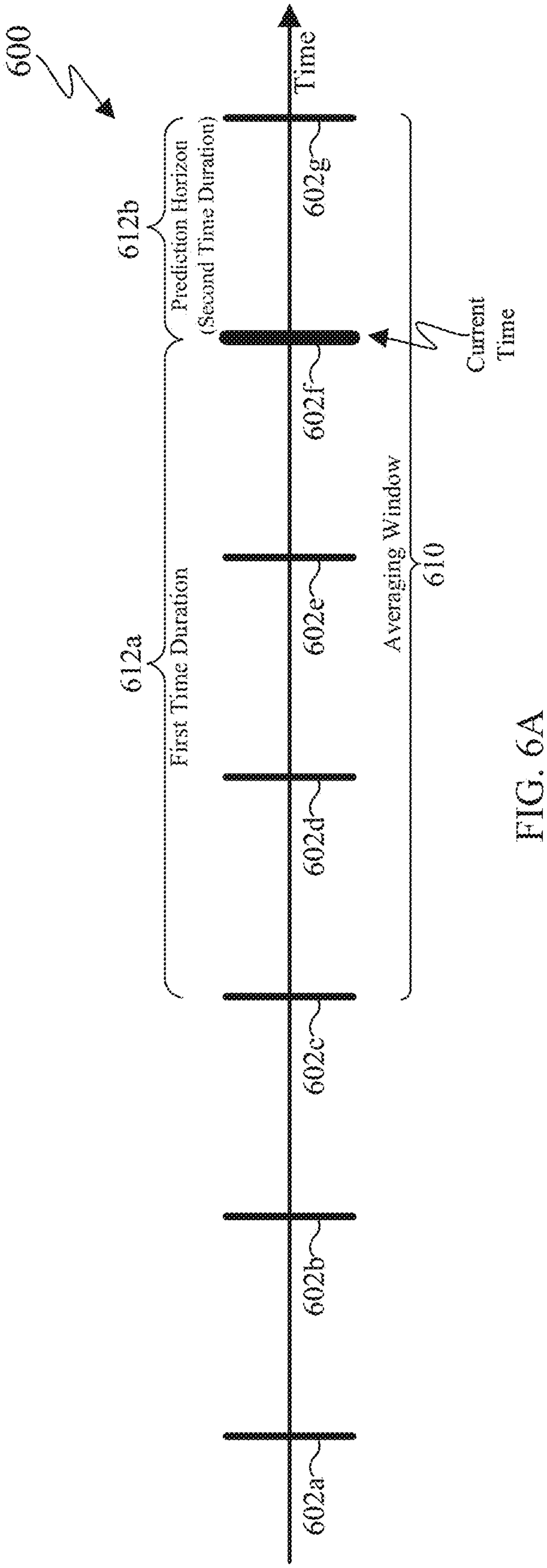
FIG. 6A illustrates a timing diagram for estimating exposure level according to embodiments of this disclosure.
Figure 6B:
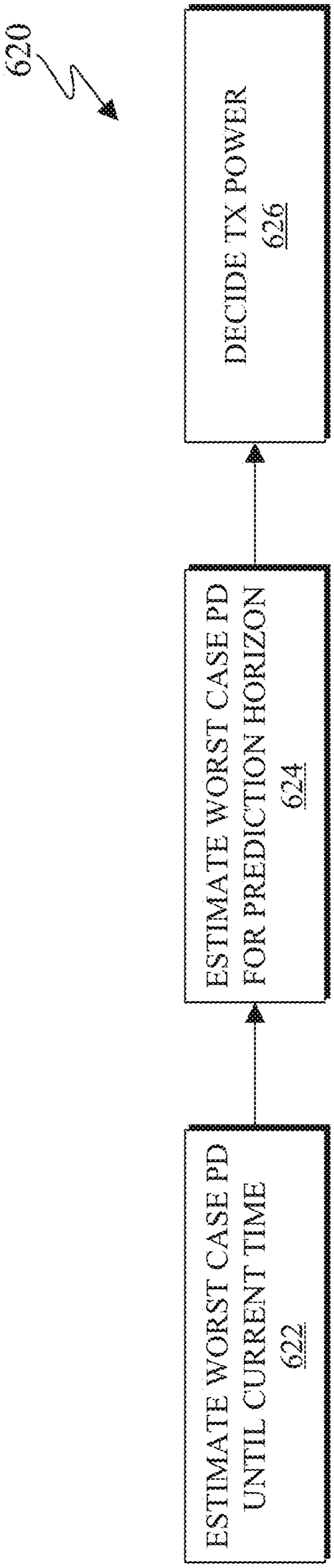
FIG. 6B illustrates a method for modifying the wireless communication based on exposure level according to embodiments of this disclosure.

FIG. 6A illustrates a timing diagram 600 for estimating exposure level according to embodiments of this disclosure. FIG. 6B illustrates a method 620 for modifying the wireless communication based on exposure level according to embodiments of this disclosure. The embodiments of the timing diagram 600 of FIG. 6A and the method 620 of FIG. 6B are for illustration only. Other embodiments can be used without departing from the scope of the present disclosure.

The method 620 is described as implemented by any one of the client device 106-114 of FIG. 1, the server 104 of FIG. 1, the electronic device 300 of FIG. 3A the electronic device 410 of FIG. 4A and can include internal components similar to that of electronic device 200 of FIG. 2. For ease of explanation, methods 620 is described as being performed by the electronic device 200 of FIG. 2.

A basic framework for managing RF exposure with radar is described in FIGS. 6A and 6B. As described above, radar detection is assumed to be updated in discrete time. The RF exposure regulations specify that the average exposure never exceeds the limit at all times. The high frequency exposure regulations specify that exposure is measured by the PD averaged over a predefined area and during a predefined time duration (specific numbers could depend on the regulatory agency). The exposure limit includes both the exposure at low and high frequency. Embodiments of this disclosure assume that the exposure at the low frequency can be estimated or known from the adopted transmission configuration of the lower frequency. As such, the PD limit for the high frequency can be derived from the maximum exposure limit minus the exposure from the low frequency. Thus PD is described in the rest of this disclosure.

The timing diagram 600 of FIG. 6A describes an example based on discrete time radar detection. The timing diagram 600 includes multiple radar detection updates 602*a*-602*g* (denoted as 602). The radar detection is updated after some radar transmission. Additionally, there are a certain number of radar detection updates within an averaging window 610 for PD estimation. The averaging window 610 includes multiple radar detection updates over a duration of time, originating from a past time and concluding at some future time (beyond the current time). The current time is to the actual time, separating previous and future times. As illustrated in FIG. 6A, the first time duration 612*a* (the previous time up to the current time) includes three radar detection updates (radar detection update 602*d*, 602*e*, and 602*f*) within the averaging window 610 including the update at the 'current time,' while the second time duration (also referred to as the prediction horizon) 612*b* does not include a radar detection update. The spacing between the radar detection updates 602 can be uniform or varied.

The RF exposure engine 426 of FIG. 4B, can, based on the RF exposure estimate over the first time duration 612*a*, estimate the worst case RF exposure for the future time, without exceeding the regulatory constraints.

The method 620 of FIG. 6B describes the electronic device 200 estimating the worst-case PD. The worst case PD is separated into two parts. First, what already happened so far in the averaging window up to and including the current time (first time duration 612*a*), and the second part includes the not-yet-known future in the prediction horizon (second time duration 612*b*) until the next radar detection update. For the prediction horizon, the estimate could depend on the predictability of the target during that time. If the prediction horizon is short (e.g., a small fraction of a second), then the target location could be reasonably predicted from the latest radar detection. Alternatively, if the prediction horizon is long then the assumption of worst case exposure might be a safer choice.

In step 622, based on these three radar detection updates (602*d*, 602*e*, and 602*f*) and the adopted TX configuration so far in the averaging window 610 (excluding the prediction horizon), the RF exposure engine 426 estimates the exposure level up to the current time. This is done to determine what PD margin is left before reaching the PD regulation limit. In step 624, the RF exposure engine 426 estimates the worst-case PD during the prediction horizon. It is noted that the radar detection so far up to the present time may or may not be used depending on the expected variability of the target and the length of the prediction horizon. This worst case estimate of the PD during the prediction horizon could be used to determine the appropriate TX power limit until the next radar update (step 626).

There are several approaches to decide the TX configuration during the prediction horizon that may depend on the radar detection scheme and the length of the prediction horizon. That is, depending on the predictability of the target of the exposure during the prediction horizon, a level of conservativeness of the worst case PD may be selected. For example, if the prediction horizon is short (e.g., only a small fraction of a second), it could be reasonable to assume the same exposure as in the current time for the entire prediction horizon. This is based on the assumption that any target would not move non-negligibly for the duration of the short prediction horizon. Another option is to consider some additional protection by assuming the target moving at some predefined speed (such as the maximum limb movement speed) to estimate the closest distance the target detected in the current time could move (assuming the worst case direction of approaching the device) to estimate the worst case PD during the prediction horizon.

A more conservative approach, which might be necessary for a long prediction horizon, is to perform time-averaging only, where the worst case exposure (e.g., target at device surface) is assumed for the entire prediction horizon. This disclosure aims at providing the ways to determine the exposure level so far (up to the current time) and the PD margin left for the prediction horizon, based on which the TX configuration may operate on, rather than the solutions to decide the TX configurations for the prediction horizon. The various embodiments, described below are for estimating the worst-case PD within the averaging window up to the current time (i.e., the first time duration 612*a* of FIG. 6A) assuming various radar capabilities, such as ranging, and detection schemes.

As referenced above, embodiments herein describe two different radar timing structures. A first radar timing structure represents pulses that are transmitted in frames of a first time interval that are separated by a frame spacing of a second time interval. Here (regarding the first radar timing structure), the first and second time intervals are different. A second radar timing structure represents pulses that are transmitted in frames that are separated by a frame spacing that matches a spacing between the pulses. Here (regarding the second radar timing structure), the spacing between pulses and frames are the same such that spacing between pulses of different frames is the same spacing as spacing between pulses of the same frame. The first radar timing structure is described with respect to FIGS. 7A and 7B, while the second radar timing structure is described with respect to FIGS. 8-14.

Although FIGS. 6A and 6B illustrate examples for PD estimation various changes may be made to FIGS. 6A and 6B. For example, while shown as a series of steps, various steps in FIG. 6B could overlap, occur in parallel, or occur any number of times.

Figure 7A:
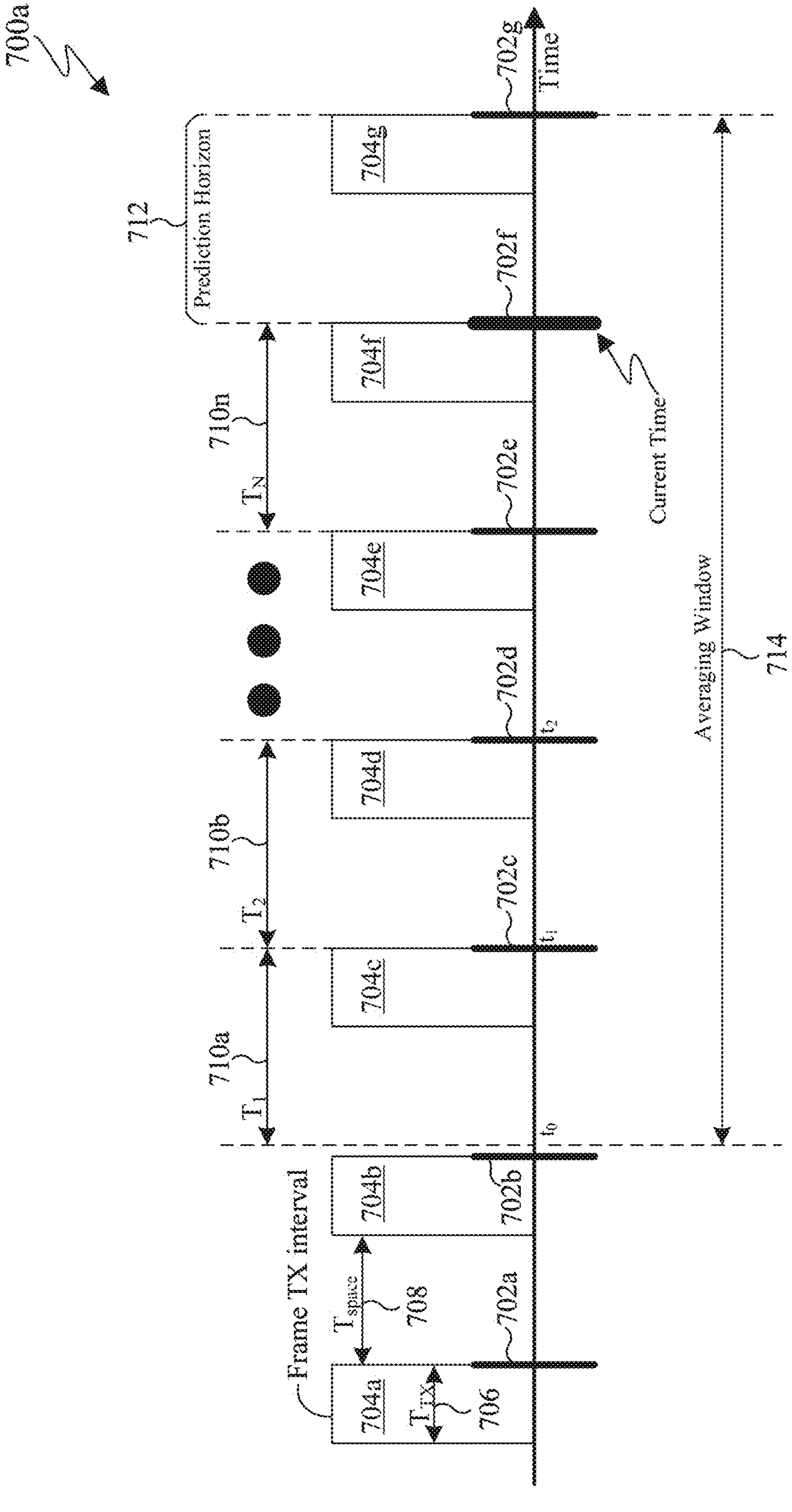
FIGS. 7A and 7B illustrate timing diagrams using a first radar timing structure for estimating exposure level according to embodiments of this disclosure.
Figure 7B:
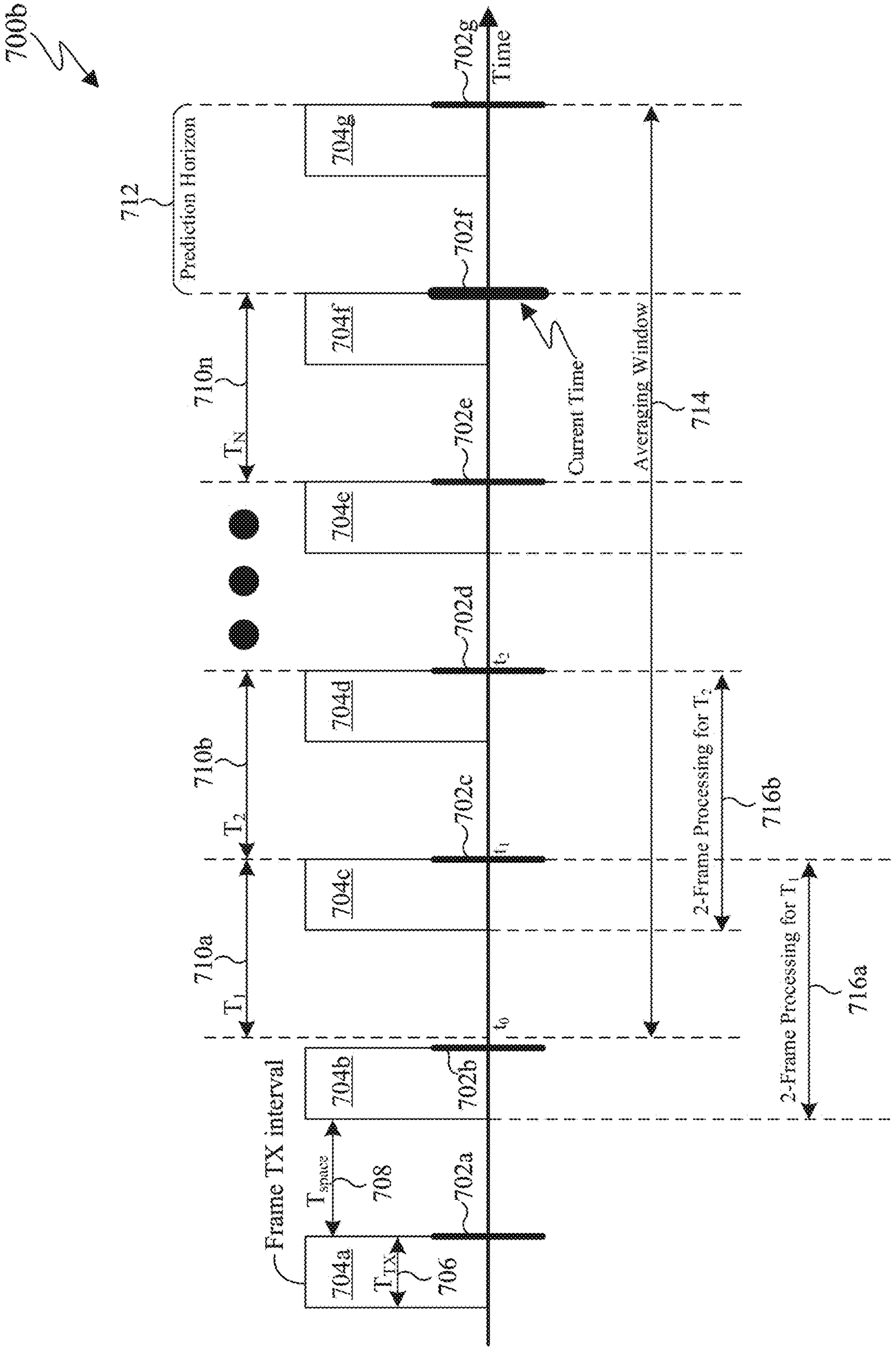

FIGS. 7A and 7B illustrate timing diagrams 700*a* and 700*b*, respectively, using a first radar timing structure for estimating exposure level according to embodiments of this disclosure. The embodiments of the timing diagram 700*a* of FIG. 7A and timing diagram 700*b* of FIG. 7B are for illustration only. Other embodiments can be used without departing from the scope of the present disclosure. It is noted that various reference numbers are the same between FIGS. 7A and 7B.

The timing diagram 700*a* of FIG. 7A is based on the first radar timing structure using single-frame processing for radar detection. The timing diagram 700*a* includes multiple radar frames (radar frames 704*a*, 704*b*, 704*c*, 704*d*, 704*e*, 704*f*, and 704*g*) that are separated by an interval space, denoted as $T_{space}$ 708. Each radar frame has a corresponding radar detection update (radar detection update 702*a*, 702*b*, 702*c*, 702*d*, 702*e*, 702*f*, and 702*g*). For example, the radar detection update 702*a* is based on the radar frame 704*a*. Additionally each radar frame has a transmission interval ($T_{TX}$). For example, $T_{TX}$ 706 is the transmission interval for the radar frame 704*a*, where radar pulses are transmitted.

A time duration (denoted as $T_i$) is the time between radar transmissions and includes a transmission interval and a $T_{space}$ 708. For example, $T_1$ 710*a*, $T_2$ 710*b* and $T_N$ 710*n* (collectively 710) are the time duration for estimating the average PD. Each of these $T_i$ with i=1, 2, . . . , N contains one radar detection update, such as the radar detection update 702*a*.

In certain embodiments, the radar detection may be conducted after every frame transmission interval (such as $T_1$ 710*a*). Since new radar detection is only available at most every radar frame duration, the worst-case PD within the averaging window until the current radar update may also be updated every radar frame duration. At the current radar update 702*f*, the worst-case averaging PD is estimated, and then the margin of PD before reaching the regulatory limit of exposure is determined. Based on this remaining PD margin and the radar detection, TX power allowable is decided for the prediction horizon. Any one of the approaches described earlier for deciding the TX power limit could be used.

The RF exposure engine 426 of FIG. 4 can estimate the worst-case PD within the averaging window until the latest radar detection update.

In one implementation, the radar detection may be based on the radar pulses transmitted within the radar frame only. This is referred to as a single-frame radar detection. With this radar transmission timing structure, there is no radar pulse transmission for $T_{space}$ in every radar frame duration. What it means is that the radar is blind during this time. Depending on the value of $T_{space}$, the worst-case PD could be estimated accordingly.

If $T_{space}$ 708 is small (e.g., a small fraction of a second), it could be reasonable to assume that there is not much change in the target location during the blind duration of $T_{space}$. Assuming there are N radar detection updates within the averaging window 714 up to and including current radar detection update 702*f* as illustrated in FIG. 7A (i.e., N radar detection updates within the First Time Duration 612*a*), Equations (17) and (18), below, describes how to estimate the worst-case PD.

$$PD_{avg-wc} = \frac{1}{\sum_{i=1}^{N} T_i} \sum_{i=1}^{N} PD_{wc-acc}[i] \tag{17}$$

$$PD_{wc-acc}[i] = \int_{t_{i-1}}^{t_i} PD_{ins}(\tau)d\tau = \int_{t_{i-1}}^{t_i} \max\left[PD_{ins}^{in-FoV}(\tau, \Gamma_{radar}^{closest}[i], \Omega_{comm}(\tau)), PD_{ins}^{out-FoV}(\tau, \Omega_{comm}(\tau))\right]d\tau \tag{18}$$

Here, $PD_{wc-acc}[i]$ is the accumulated PD over the duration of $T_i$ (considering worst case radar detection for that duration), $t_i$ denotes the time instant at the end of the period $T_i$ as indicated in FIG. 7A, and $\Gamma_{radar}^{closest}[i]$ denotes the detection information corresponding to the closest target detection in the radar frame corresponding to the time period $T_i$. For conceptual clarity, $PD_{wc-acc}[i]$ is written in integration format. In reality, the TX configuration of the communication module could be saved in a discrete sequence (though likely with a much finer time granularity than the radar update rate), and the integration could be replaced with an approximate summation form.

It is noted that the previous calculation assumes closest target detected at the end of the period $T_i$. In an alternative implementation, closest target between the two adjacent periods could be used instead to exploit the detection result at the start and end of a period $T_i$. More specifically, instead of using $\Gamma_{radar}^{closest}[i]$, it is replaced by $\Gamma_{radar}^{closest-2}[i]$ and described in Equation (19), below.

$$\Gamma_{radar}^{closest-2}[i]=\min(\Gamma_{radar}^{closest}[i-1], \Gamma_{radar}^{closest}[i]) \tag{19}$$

Here, the min operator can be understood as picking the detection results with the smaller range (i.e., the closer target) between the two choices.

In yet another implementation, some margin in the range estimation could be added to account for a worst case target movement by assuming the target of the exposure could move by some speed $V_{max}$ (e.g., selected to be larger than typical human movement speed). In this case, the radar detection in $T_i$ is replaced by $\Gamma_{radar}^{closest+\varepsilon}[i]$ whose target range is described in Equation (20), below.

$$\text{target range of } \Gamma_{radar}^{closest+\varepsilon}[i]=\max([\text{target range of } \Gamma_{radar}^{closest}[i]-V_{max}T_{space}, d_{min}]) \tag{20}$$

It is noted that the target range of $d_{min}$, of Equation (20), can be interpreted as the worst position in terms of exposure. For example, the value of $d_{min}$ could be 0 or it could be some small distance. If the radar is capable of estimating the speed of the target, the estimated target speed could be used instead of $V_{max}$, and an additional margin on the speed estimate could be incorporated considering the accuracy of the speed estimate. Specifically, Equation (21) can be included in Equation (20), where $\hat{V}_i$ is the speed estimate and a is used to account for the speed estimation error.

$$V_{i,\varepsilon}=\hat{V}_i+\sigma \tag{21}$$

Alternatively, when the blind duration $T_{space}$ 708 is not small (such as when $T_{space}$ 708 is larger than a threshold) this could create substantial uncertainty in the location of the detected target. In this example, a conservative estimate could be adopted for the blind durations. One option for this is to assume the worst case exposure during the blind duration. The radar detection result is used to estimate the worst-case PD only during the radar frame transmission interval $T_{TX}$. In this case, the accumulated exposure $PD_{wc-acc}[i]$ is described in Equation (22), below.

$$PD_{wc-acc}[i]=\int_{t_{-1}}^{t_i T_{TX}} PD_{wc}(\tau, \Omega_{comm}(\tau))d\tau+\int_{t_i-T_{TX}}^{t_i} PD_{ins}(\tau)d\tau, \tag{22}$$

Here $PD_{wc}(\tau, \Omega_{comm}(\tau))$ denotes the worst-case PD (e.g., at the device surface) given the communication module transmit configuration at that time $\Omega_{comm(\tau)}$.

In another variation, for a short time $\Delta T$ near the radar active transmission duration, it could be assumed that the target has not moved non-negligibly, and the radar detection result could be applied to that duration $\Delta T$. More specifically, in this case, Equation (22) could be amended as described in Equation (23), below.

$$PD_{wc-acc}[i]=\int_{t_{-1}}^{t_i-(T_{TX}+\Delta T)} PD_{wc}(\tau, \Omega_{comm}(\tau))d\tau+\int_{t_i-(T_{TX}+\Delta T)}^{t_i} PD_{ins}(\tau)d\tau \tag{23}$$

In certain embodiments, radar detection may adopt the detection of movement to differentiate human body part (the subject of the exposure that is of concern) from other objects. This was described above in FIG. 5B. In such a radar solution, the reliability of the detection depends on having a long radar frame that could capture even a small or weak movement by the human subject (such movement could be some involuntary micro-movement while the human subject might be sitting or lying still). In such a case, rather than just simply increasing $T_{TX}$ which could increase the radar duty cycle and power consumption, multiple radar frames may be combined together, and the target detection and ranging is done on a multiple-frame basis. This is shown in the timing diagram 700*b* of FIG. 7B.

The timing diagram 700*b* as illustrated in FIG. 7B is similar to the timing diagram 700*a* of FIG. 7A. As such, various reference numbers of the timing diagram 700*a* are reused to define similar aspects in the timing diagram 700*b*.

As illustrated in FIG. 7B, the timing diagram 700*b* includes a two-frame processing 716*a* and 716*b* for radar detection. The two-frame processing 716*a* and 716*b* combines two adjacent radar frames and used as a single radar processing frame for radar detection by applying the procedure described in FIG. 5B, for PD estimation. For example, for the two-frame processing 716*a*, the processing window includes the radar frame 704*b* and the radar frame 704*c* and the $T_{space}$ therebetween. Similarly, for the two-frame processing 716*b*, the processing window includes the radar frame 704*c* and the radar frame 704*d* and the $T_{space}$ therebetween. It is noted that the radar frame 704*c* is included in both the two-frame processing 716*a* and the two-frame processing 716*b*.

Here, the radar detection for $T_1$ 710*a* uses the radar transmission frame ending at time $t_1$ (corresponding to radar detection update 702*c*) and a radar frame preceding that (outside the averaging window 714). Similarly the radar detection for $T_2$ 710*b* uses the radar transmission frame ending at time $t_2$ (corresponding to radar detection update 702*d*) and the radar frame ending at time $t_1$ (corresponding to radar detection update 702*c*), and so on. Once the radar detection results are obtained for each of $T_i$ within the averaging window 714, the handling of the blind duration could be done using the same approaches as described for the single-frame processing implementation.

While for ease of description, two-frame processing is described here, any k-frame processing (where k>2) can be used in the same manner as described so far. It is noted that multi-frame processing is more sensitive and have higher detection rate. That is, with a larger k (the more frames used in the multi-frame processing), the worst exposed target detection would tend to be overestimated than when using a smaller k due to the overlapping between the k-frame radar processing frames. Therefore, using a larger k can be interpreted to be a more conservative estimate from the exposure perspective (i.e., a safer option for avoiding maximum permissible exposure (MPE) violation).

In another radar implementation, the second radar timing structure (the radar transmission timing structure as described in FIG. 3D) may be adopted. With respect to the second radar timing structure, radar pulses are transmitted at roughly equal duration when the radar is on. Compared to the first radar timing structure (as described in FIG. 3C), the second radar timing structure has no large frame spacing (the blind duration) any more as the pulse spacing can be much smaller compared to the frame spacing. For example, a pulse interval could range in several to a few tens of milliseconds at most, while a frame spacing could be 100s of milliseconds.

Consider a specific example where 128 pulses are transmitted per one second. For the frame structure of FIG. 3C, with a two millisecond pulse interval, the frame spacing is 744 milliseconds. If adopting the structure of FIG. 3D, the pulse interval is 7.8 milliseconds. With this much smaller spacing between pulses, the blindness of radar is negligible. Note that the averaged duty cycle over one second is the same for the two choices of the radar timing structure in this example. FIGS. 8-14 describe several embodiments using this radar transmission timing structure of FIG. 3D for MPE management purpose.

Figure 12:
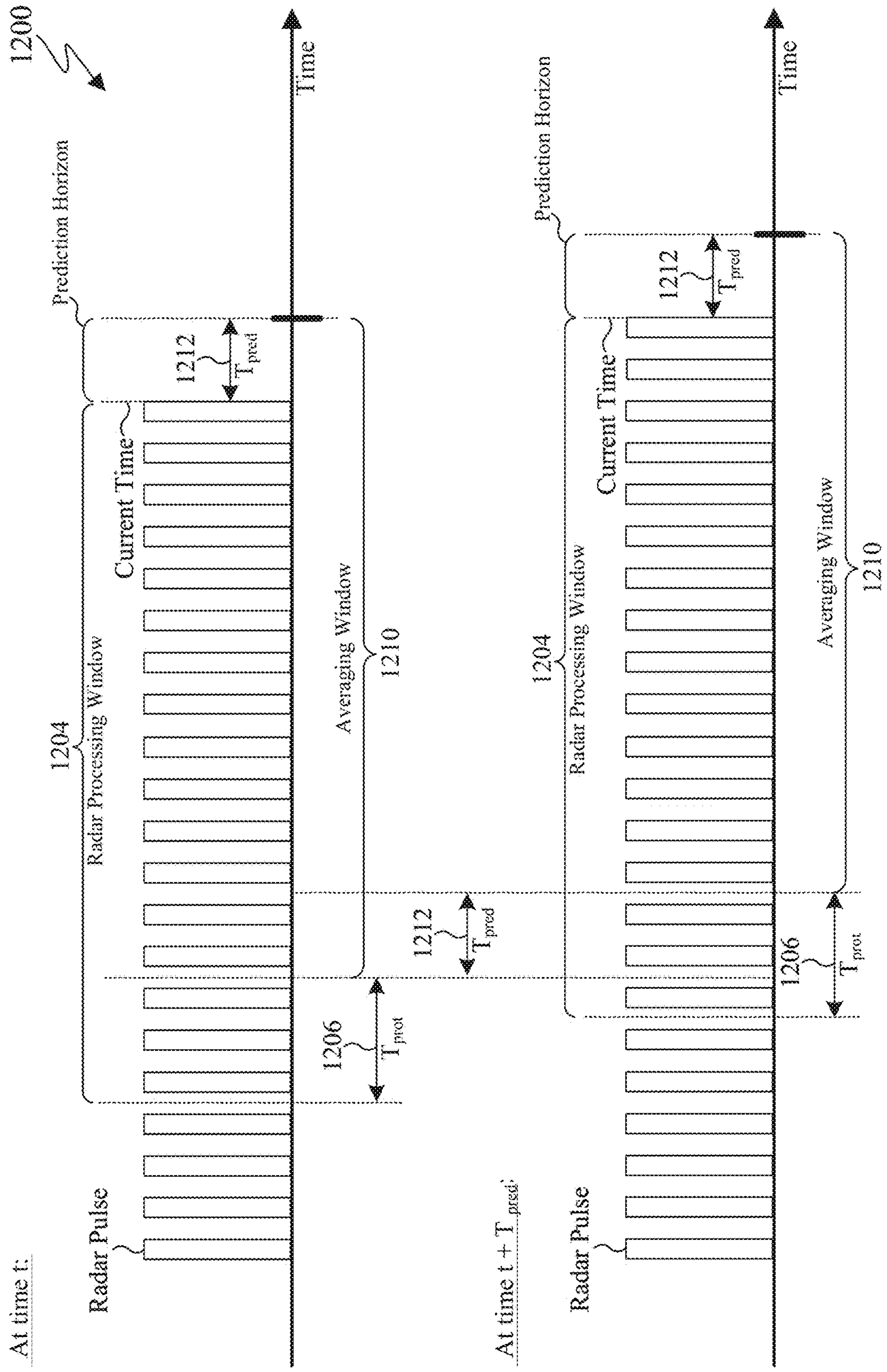
Figure 13:
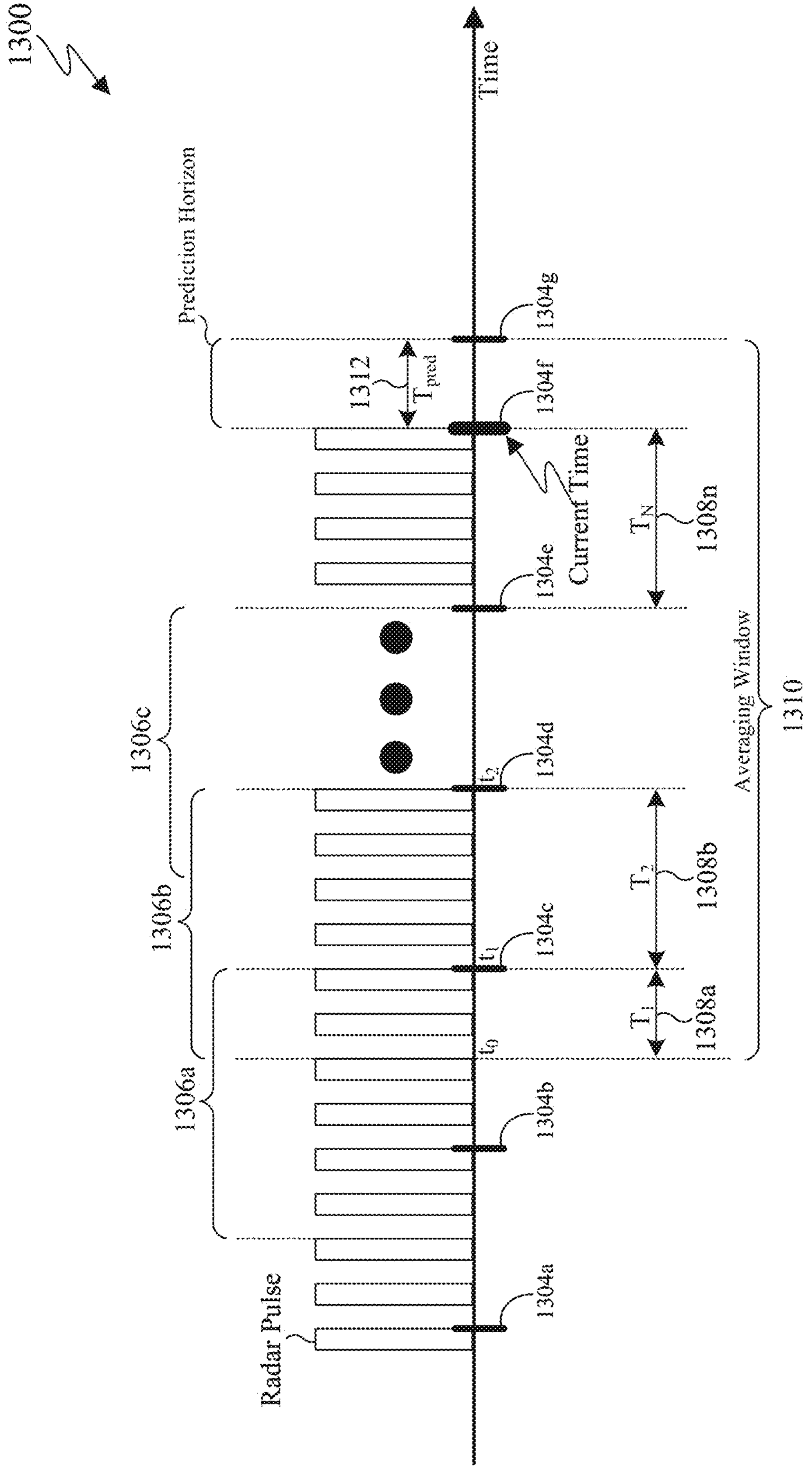
Figure 14:
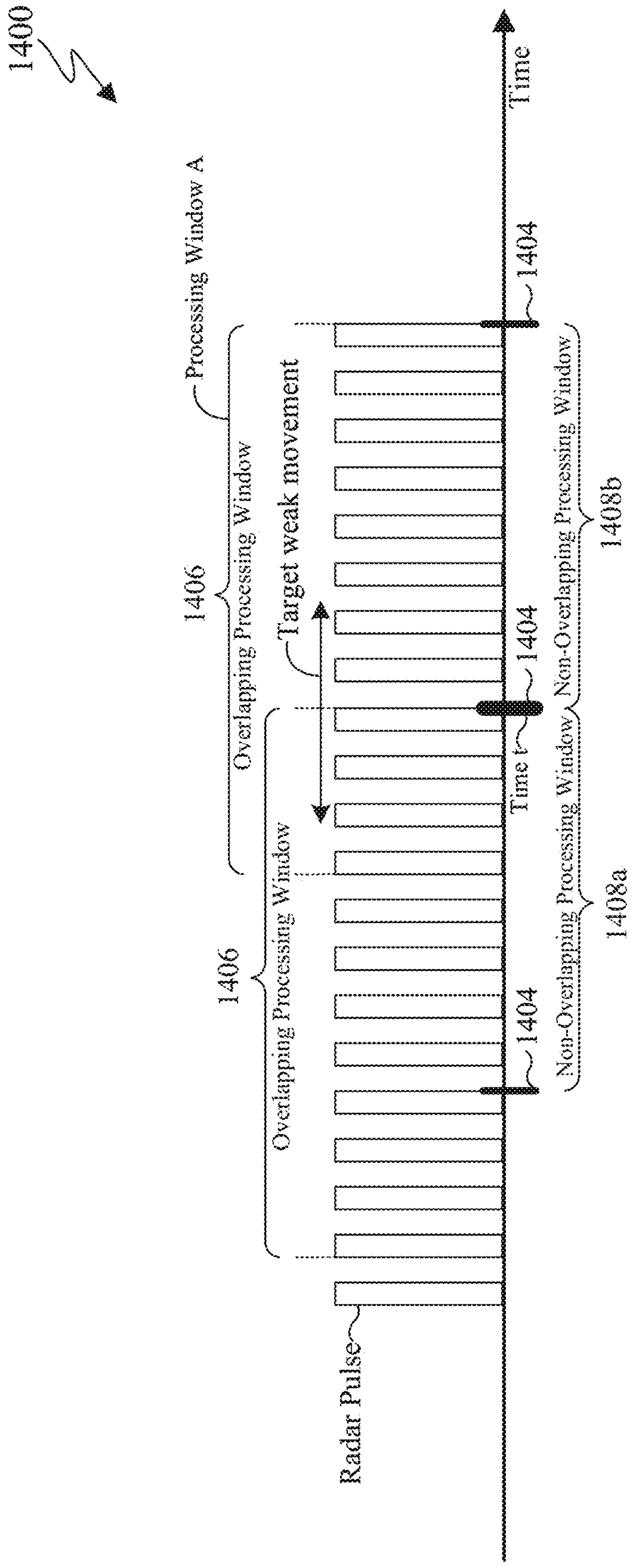

FIGS. 8-14 illustrate timing diagrams 800, 900, 1000, 1100, 1200, 1300, and 1400 respectively using the second radar timing structure for estimating exposure level density according to embodiments of this disclosure. The embodiments of the timing diagram 800 of FIG. 8, the timing diagram 900 of FIG. 9, the timing diagram 1000 of FIG. 10, the timing diagram 1100 of FIG. 11, the timing diagram 1200 of FIG. 12, the timing diagram 1300 of FIG. 13, and the timing diagram 1400 of FIG. 14 are for illustration only. Other embodiments can be used without departing from the scope of the present disclosure. It is noted that various reference numbers are the same between FIGS. 8-14.

Figure 8:
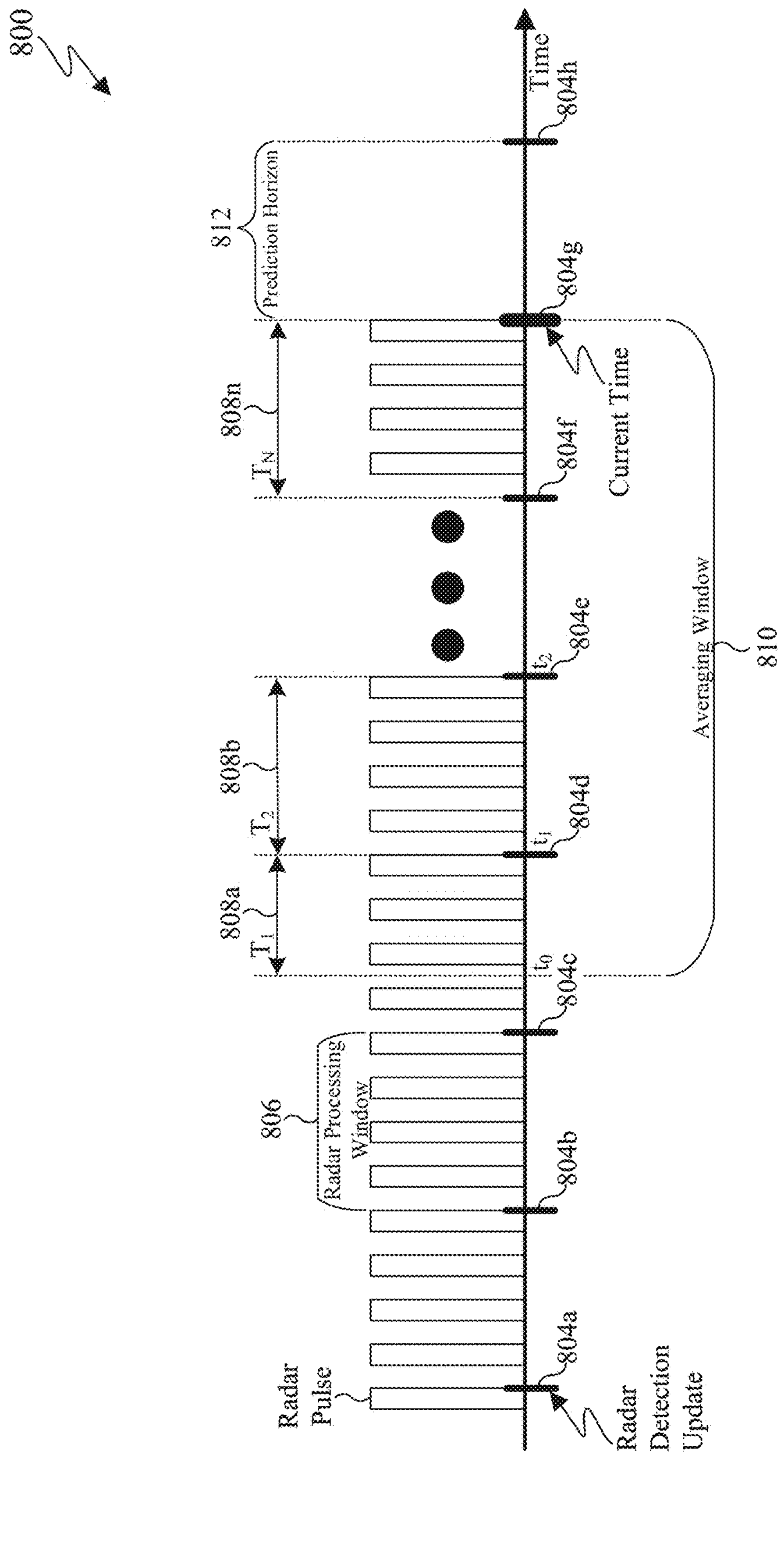
FIGS. 8-14 illustrate timing diagrams using a second radar timing structure for estimating exposure level density according to embodiments of this disclosure.

FIG. 8 illustrates the timing diagram 800, which corresponds to the second radar timing structure as described in FIG. 3D. Here, non-overlap radar processing windows are adopted with a fixed radar processing boundaries. Due to the fixed processing windows, the shortest allowable prediction horizon duration is equal to the radar processing window length.

The timing diagram 800 of FIG. 8 is based on the second radar timing structure. The timing diagram 800 includes multiple pulses that are separated by a pulse space. After a number of pulses a radar detection update (radar detection update 804*a*, 804*b*, 804*c*, 804*d*, 804*e*, 804*f*, 804*g*, and 804*h*) occurs. For example, the radar detection update 804*a* is based on a radar frame. A time duration between the pulses of a frame and the time duration between the radar frames is the same. Accordingly, $T_1$ 808*a*, $T_2$ 808*b* and $T_N$ 808*n* (collectively 808) are the time duration for estimating the average PD. Each of these $T_i$ with i=1, 2, . . . , N contains one radar detection update, such as the radar detection update 804*d*.

The radar pulses within the averaging window 810 as shown in FIG. 8 exclude the prediction horizon are divided into N non-overlapping windows, where each window contains M radar pulses. It is noted that M=4 in FIG. 8. The M pulses within a radar processing window can be treated as a radar frame, and they can be processed using the procedure described in FIG. 5B. This way, one radar detection update can be obtained for each radar processing window. This would provide the same setup as described in FIG. 7A and the PD estimation procedure for a short $T_{space}$ could be used since here $T_{space}$ is equal to the pulse spacing and the blind duration is not an issue.

One tradeoff for this design choice is how to balance the reliability of the detection and the duration of the prediction horizon 812. For example, using a longer radar processing would provide a more robust detection for micro/weak movement (thanks to the longer observation time of the radar signal), but at the same time it also means a longer prediction horizon. With a long prediction horizon, for safety reason, it could be best to assume the worst case exposure (e.g., exposure target at the device surface) without using radar detection. Accordingly, FIGS. 9-14 describe several methods to avoid this tradeoff with some additional processing complexity.

Figure 9:
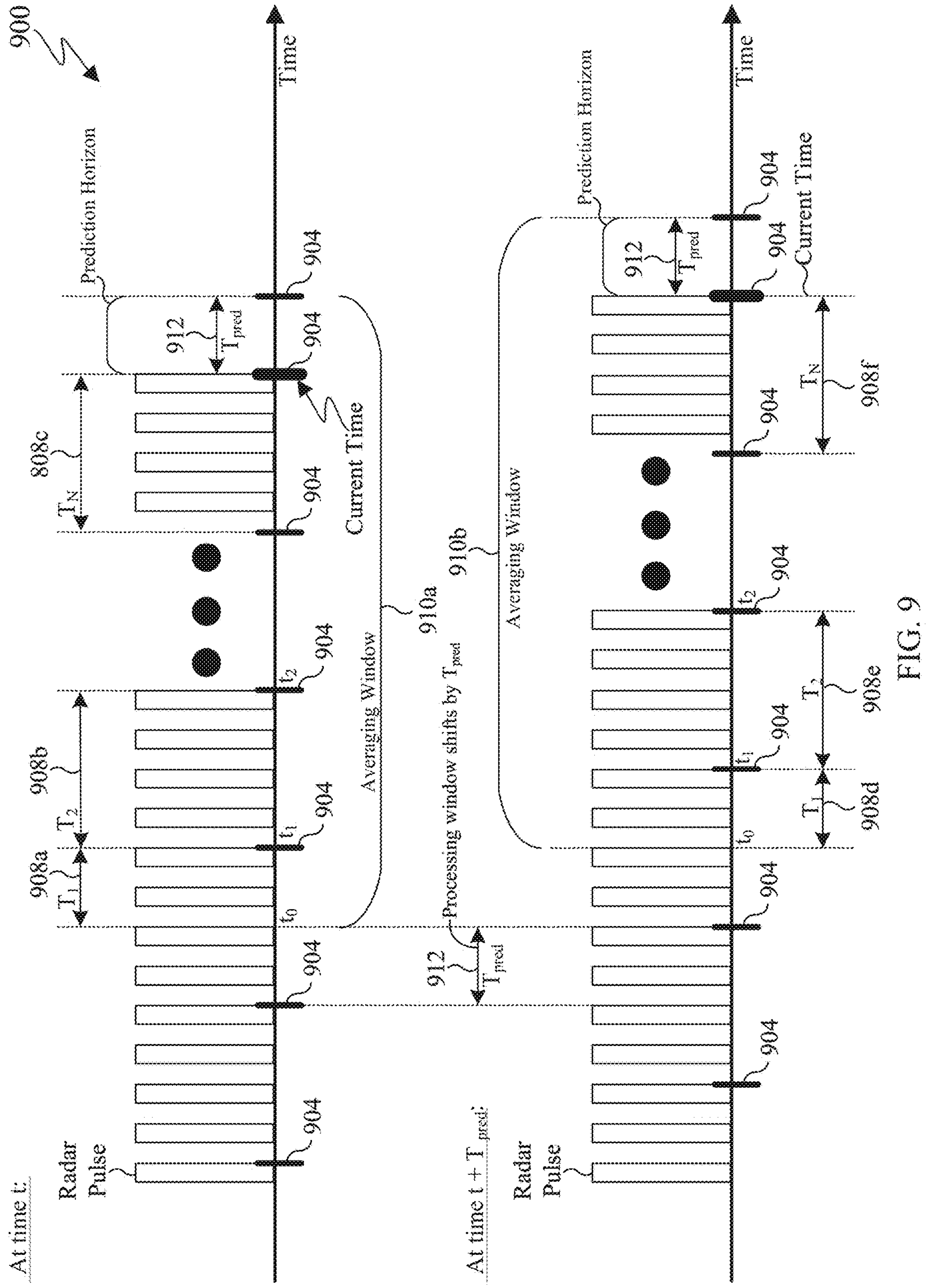

FIG. 9 illustrates the timing diagram 900, which corresponds to the second the second radar timing structure as described in FIG. 3D. Here, non-overlap radar processing windows are adopted, but unlike in FIG. 8, the radar processing windows definition changes. Particularly, the boundaries of the radar processing window are shifted by $T_{pred}$ 912. This allows the use of $T_{pred}$ 912 shorter than the radar processing window duration.

The timing diagram 900 of FIG. 9 includes multiple pulses that are separated by a pulse space. After a number of pulses a radar detection update 904 occurs. For example, the radar detection update 904 is based on a radar frame. Accordingly non-overlapping radar processing windows, $T_1$ 908*a*, $T_2$ 908*b* and $T_N$ 808*c*, as well as $T_1$ 908*d*, $T_2$ 908*e* and $T_N$ 808*f* (collectively radar processing windows 908) are individual time durations for estimating the average PD.

Each of these $T_i$ with i=1, 2, . . . , N contains one radar detection update, such as the radar detection update 904.

As illustrated in FIG. 9, the radar processing windows are not fixed but could change over time to allow the flexibility to select the prediction horizon. Here the radar processing frame is shifted in every duration of prediction horizon $T_{pred}$. In this case, the RF exposure engine 426 could update the transmission configuration following the steps as described in FIG. 6B every prediction horizon $T_{pred}$, rather than every radar processing window duration.

In keeping the same radar processing window (longer than $T_{pred}$), the radar processing window could be shifted by $T_{pred}$ 912. Here, the radar processing window boundaries (corresponding to one of the radar detection updates 904) are marked by the ticks on the time axis. Due to this change in the radar processing window boundaries, radar detection as well as the estimate of the PD for that window should be recomputed.

This is the additional cost compared to the embodiment described in FIG. 8 in exchange for flexible selection of $T_{pred}$. That is, the ability to select a time duration of $T_{pred}$, as described in FIG. 9, causes the additional computations for radar detection and estimating the PD for a corresponding window. Note that if $T_{pred}$ is selected such that the radar processing window is a multiple of $T_{pred}$, then the shift becomes periodic, and the previous calculation could be reused. In this case, the most recent radar processing window is processed and stored to some memory, and the radar detection results for those older radar processing frames could be read from the memory.

Figure 10:
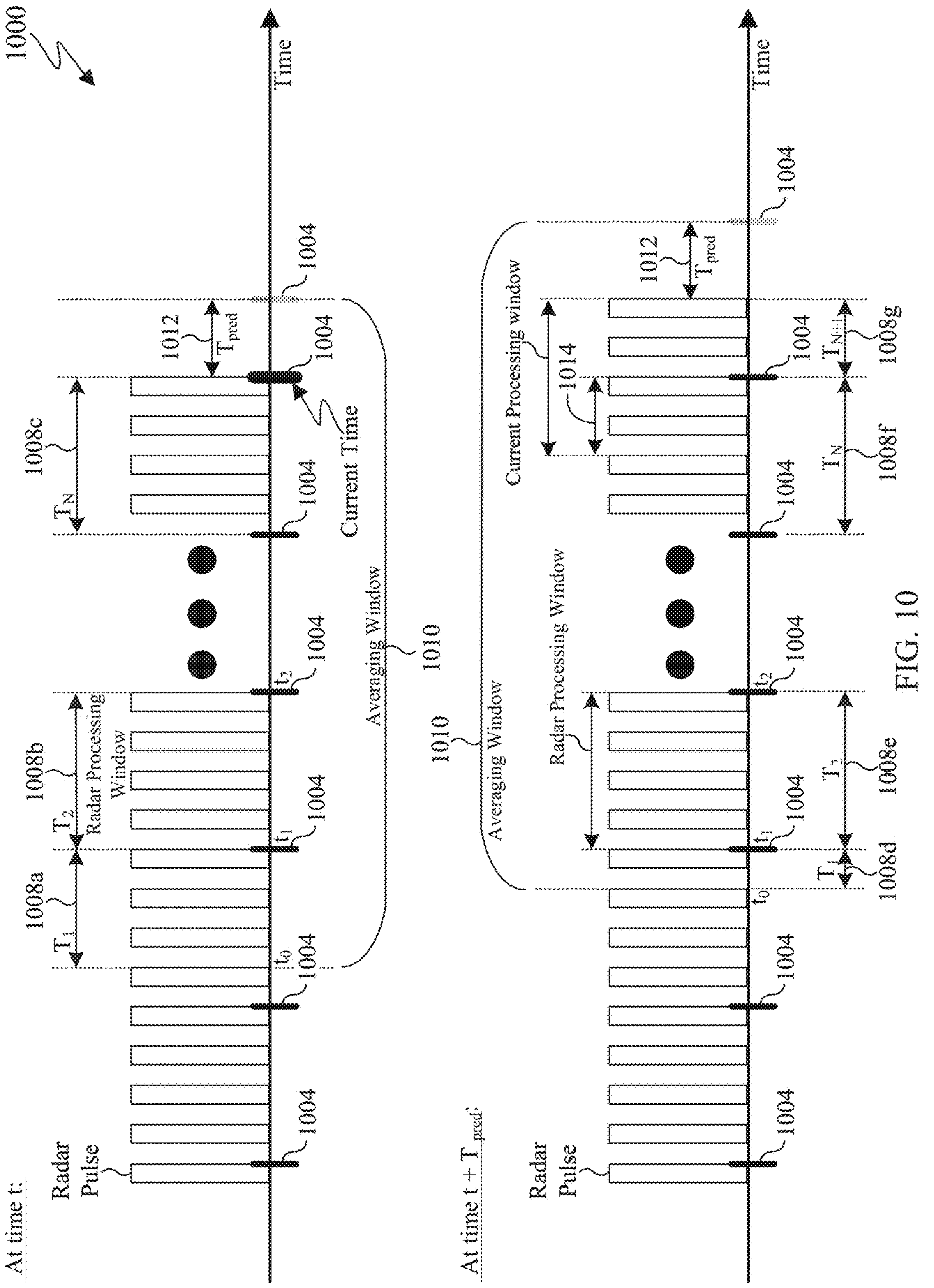

FIG. 10 illustrates the timing diagram 1000, which corresponds to the second radar timing structure as described in FIG. 3D. Here, non-overlap radar processing windows are adopted, but unlike FIG. 8, overlap is allowed for the current radar processing window. This overlap allows the use of $T_{pred}$ 1012, which is shorter than the radar processing window duration while keeping the processing window boundaries fixed.

The timing diagram 1000 of FIG. 10 includes multiple pulses that are separated by a pulse space. After a number of pulses a radar detection update 1004 occurs. For example, the radar detection update 1004 is based on a radar frame. Accordingly, the durations $T_1$ 1008*a*, $T_2$ 1008*b* and $T_N$ 1008*c*, as well as $T_1$ 1008*d*, $T_2$ 1008*e*, $T_N$ 1008*f*, and $T_N$+1 1008*g* (collectively radar processing windows 1008) are the time duration for estimating the average PD at time t and time t+$T_{pred}$, respectively. Each of these $T_{i\ with\ i=}$1, 2, . . . , N contains one radar detection update, such as the radar detection update 1004*b*.

As illustrated in FIG. 10, the radar processing window boundaries are kept fixed. Here, the current radar processing window is redefined by allowing overlap with the previous processing window. Note that in this case, depending on current time relative to the latest radar processing window boundary, there can be either N or N+1 radar processing windows within an averaging window 1010 excluding $T_{pred}$ 1012.

For example, at time t (top timing structure of FIG. 10), the end of the last fixed radar processing window is at the current time, so there are N radar processing windows. In the next $T_{pred}$ (the bottom timing structure of FIG. 10), the current time is $T_{pred}$ from the latest fixed radar processing boundary, and to cover the time between that end of the last fixed radar processing window, one more radar processing window is introduced which is shown as $T_{N+1}$ in the figure. With this approach, there is no longer a need to save the various shifted versions of the processing windows as in the previous embodiment, and thus it reduces the memory usage while keeping the same computational complexity.

It is noted that by allowing the current radar processing window to overlap with the previous processing window, the radar detection can be considered to be more conservative than the embodiment in FIG. 9 that does not have overlap. This is because the detection by those radar pulses in the overlap regions are accounted for twice. Also note that while the radar processing has overlap, the computation of the PD estimate should only include the non-overlap duration only.

Figure 11:
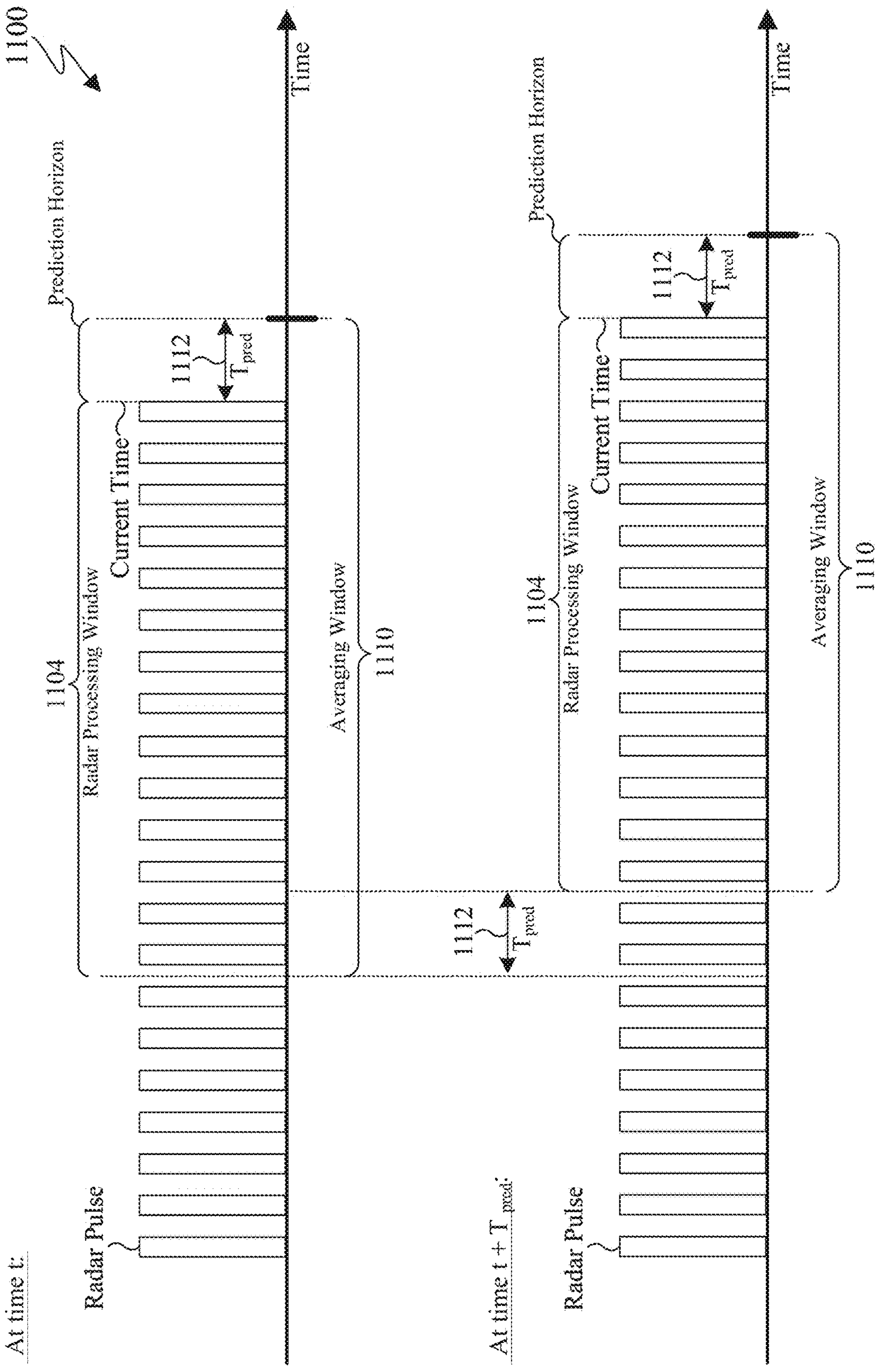

FIG. 11 illustrates the timing diagram 1100, which corresponds to the second radar timing structure as described in FIG. 3D. Here, one radar processing window is defined to cover the whole averaging window up to the current time (i.e., excluding $T_{pred}$ 1112). A benefit for using such a long processing window is the high reliability in the radar detection for moving target (especially, those with weak movement).

The timing diagram 1100 of FIG. 11 includes multiple pulses that are separated by a pulse space. To ensure that any target (especially static body part) would be detected (with probability approaching one), the radar processing window 1104 duration could be selected to be as long as possible. In one implementation, there is only one radar processing window 1104 for an averaging window 1110, and the duration of the radar processing window 1104 is equal to the averaging window 1110 duration minus $T_{pred}$ 1112. In this case, there is a single radar detection update per averaging window 1110. Since the radar pulses stretch across a long duration (for example, the current averaging window 1110 could be four seconds to correspond with the averaging window length defined by the FCC for high frequency above 6 GHz), this radar detection can be considered as a time-lapse picture of the past duration of the length of the radar processing window 1104. The RF exposure engine 426 can interpret this time-lapse like radar detection as taking the worst case target exposure within the radar processing window 1104.

For example, consider a case where there is a hand approaching the device at the beginning of the radar processing window 1104, but the hand just passed by and got out of the radar FoV and stayed out of the radar FoV for the rest of the time. In this case, the time-lapse radar detection would detect the hand at the closest approaching distance (in fact, the radar would detect the trajectory of the hand for this movement), which is the worst case exposure within the radar FoV that happened during this radar processing window 1104. Thus, this provides a conservative estimate of the exposure for the current averaging window 1110 minus the prediction horizon. Specifically, this means that in Equation (17), N=1. When N=1 this reduces the summation to just one term. This means that Equation (18) can be computed for i=1, and $t_0$ is the start of the radar processing window 1104, and $t_1$ is the current time.

FIG. 12 illustrates the timing diagram 1200, which corresponds to the second radar timing structure as described in FIG. 3D. Here, one radar processing window (such as the radar processing window 1014) is defined to cover the whole averaging window 1210 up to the current time (i.e., excluding $T_{pred}$ 1212). Unlike the embodiment described in FIG. 11, here the radar processing window 1204 is allowed to extend further beyond the beginning of the processing window.

To protect against the boundary effect and/or to further increase the radar detection reliability, a radar processing window that is longer than the averaging window 1210 duration minus $T_{pred}$ could be used. The boundary effect refers to when a target has some movement for a duration that happens to be at the radar processing window boundary, and thus that movement duration could be split between two radar processing windows (see FIG. 14 for further details).

As illustrated in FIG. 12 the radar processing window 1204 has an additional length of $T_{prot}$ 1206 for protecting against boundary effect, providing increased detection reliability, or both. This works in the same manner as described in FIG. 11, except that the radar detection actually covers an additional period $T_{prot}$ 1206 before the starting point of the averaging window 1210. This means that there is still a single term in the summation of Equation (17) (as described above in reference to FIG. 11) and therefore Equation (18) can be computed for i=1. It is noted that $t_0$ is the start of the averaging window 1210, and $t_1$ is the current time.

FIG. 13 illustrates the timing diagram 1300, which corresponds to the second the second radar timing structure as described in FIG. 3D. Here, overlapping radar processing windows (such as the radar processing windows 1306*a*, 1306*b*, and 1306*c*) (collectively overlapping radar processing windows 1306) can be used.

The timing diagram 1300 of FIG. 13 includes multiple pulses that are separated by a pulse space. After a number of pulses a radar detection update (radar detection update 1304*a*, 1304*b*, 1304*c*, 1304*d*, 1304*e*, 1304*f*, and 1304*g*) occurs (collectively referred to as radar detection update 1304. Accordingly, $T_1$ 1308*a*, $T_2$ 1308*b* and $T_N$ 1308*n* are the time duration for estimating the average PD. Each of these $T_i$ with i=1, 2, . . . , N contains one radar detection update, such as the radar detection update 1304.

As illustrated in FIG. 13, there are multiple radar processing windows 1306 within an averaging window 1310. Unlike the embodiment described in FIGS. 8 and 9, these radar processing windows have overlaps. Here, the selection of the prediction horizon $T_{pred}$ 1312 and the treatment of the last radar processing frame as described in FIGS. 8-10 are applicable in the same manner as described in those embodiments. It is noted that the option to shift the radar processing windows (i.e., the approach of FIG. 9) is equivalent to keeping the same amount of overlap between the radar processing frames including the current radar processing frame. The option to keep the same radar processing window boundaries by introducing overlap between the current radar processing window and its preceding one (i.e., the approach of FIG. 10) is equivalent to allowing additional overlap amount for the current radar processing window. Therefore, a decision between these two design choices comes down to whether it is desirable to keep the conservativeness of the radar detection of the current radar processing window and the rest of the windows in the averaging window or not. By allowing additional overlap, it can be interpreted as being more conservative as more pulses are used more than once for the radar detection.

FIG. 14 illustrates the timing diagram 1400, which corresponds to the second radar timing structure as described in FIG. 3D. Here, overlapping windows 1406 could help prevent misdetection when detectable events (such as when the 'target weak movement') happen at the radar processing update times.

The timing diagram 1400 of FIG. 14 includes multiple pulses that are separated by a pulse space. After a number of pulses a radar detection update 1404 occurs.

A benefit of having the overlapping windows 1406 (as described in FIG. 13) is to provide protection against the boundary effect. For example, consider a case where the target caused some weak movement for a certain duration that is covered by k consecutive radar pulses. An illustration of this situation is shown in FIG. 14, where k is equal to 5. In this example, if the radar processing window was defined by the radar detection update points without overlap, then the k=5 radar pulses would be split between two radar processing windows (such as the radar processing window 1408*a* and the radar processing windows 1408*b*). This would weaken the signal and could lead to misdetection. With overlapping windows 1406 as in FIG. 14, the processing window A (corresponding to one of the overlapping windows 1406) would be able to cover all the k radar pulses, and the radar detection using the processing window A would likely detect the target accurately.

It is noted that the overlapping window approach to deal with the boundary effect solves half of the problem. The boundary effect could still affect the processing window prior to processing window A. One way to deal with this is to take the worst between two adjacent (i.e., overlapping) windows for exposure estimation. That is, one could use the overlapping windows in combination with approach described in Equation (19) to deal with the boundary effect.

Also the boundary effect can be more pronounced for a short processing window. For example, the event of weak movement as described above could be due to some involuntary muscle movement of the human subject. Such events could happen following some distribution (e.g., some Poisson-like distribution with certain parameters). If the processing window duration is chosen so short that only one such event is likely to happen, then it can be expected that the boundary effect could be severe. If the processing window duration is chosen long enough such that multiple such events could be expected to happen, then the boundary effect could be less critical.

Although FIGS. 7A-14 illustrate example timing diagrams various changes may be made to FIGS. 7A-14. For example, the spacing between pulses and frames can differ, the frame or pulse durations can differ, the size of the averaging window can differ, or the like.

In certain embodiments, due to the choices of the radar configuration parameters (including the transmit power, antenna gains, and the like), the radar could miss detect the desired target (body parts of a human) with non-negligible probability. This is denoted the misdetection rate. In this case, additional margin in the exposure level estimation can be used to avoid violating the regulatory limit when misdetection happens. The following examples describe several ways to derive this margin based on the radar setting.

For example, misdetection can be derived based on non-overlapping radar processing windows. The non-overlapping radar processing windows can be applied to both the first radar timing structure (long spacings between frames) and the second radar timing structure (roughly-equal-pulse-spacing structure of FIG. 3D). In this case, the radar is updated every radar processing window (denoted as $T_{rad}$), and the margin and past exposure is updated every prediction horizon duration $T_{pred}$. As described above, it can be assumed that there are N radar processing windows within the averaging window minus $T_{pred}$. The radar misdetection rate is δ (this could be obtained from actual measurement evaluation for a stress-test scenario to estimate the worst misdetection rate of the radar). The misdetection rate can be interpreted to mean that it is expected that there are $M=\lceil N\delta \rceil$ radar processing windows with misdetection within one averaging window, where $\lceil \cdot \rceil$ denotes the ceiling function. Denote $PD_{wc\text{-}acc}^{decr}[i]$ the sorted $PD_{wc\text{-}acc}[i]$ in decreasing order, $T_i^{decr}$ the corresponding processing window duration, and Δ the margin, the exposure level in the averaging window excluding $T_{pred}$ is described in Equations (24) and (25), below. The expression $PD_{wc\text{-}acc}^{surf\text{-}avg}[i]$, of Equation (25), denotes the worst case exposure level in terms of the target location (e.g., exposure at the device surface) with the worst TX configuration for the averaging window, which is described in Equation (26), below.

$$PD_{avg-wc} = \frac{1}{\sum_{i=1}^{N-M} T_i^{decr}} \sum_{i=1}^{N-M} PD_{wc-acc}^{decr}[i] + \Delta \tag{24}$$

$$\Delta = \sum_{i=1}^{M} PD_{wc-acc}^{surf-avg}[i] \tag{25}$$

$$PD_{wc-acc}^{surf}[i] = \max_{n=1,\ldots N} \frac{1}{t_n - t_{n-1}} \int_{t_{n-1}}^{t_n} \max\left[PD_{ins}^{in-FoV}\left(\tau, \Gamma_{radar}^{surf}, \Omega_{comm}(\tau)\right), PD_{ins}^{out-FoV}(\tau, \Omega_{comm}(\tau))\right] d\tau \tag{26}$$

Here, the expression, $\Gamma_{radar}^{surf}$ denotes the worst case exposure location such as on the device surface.

It is noted that Equations (24)-(26) indicate that the M lowest average PD processing windows are replaced with the M worst exposure level $PD_{wc\text{-}acc}^{surf}[i]$ to account for the expected misdetection cases, where the target is wrongly assumed to be non-existing. Note that $PD_{wc\text{-}acc}^{surf}[i]$ may be derived from actual measurements and/or simulation.

In the above, the assumption for the worst case TX configuration for $PD_{wc\text{-}acc}^{surf}[i]$ is a rather conservative estimate. A tighter estimate can be obtained by selecting the M worst TX configurations from the N radar processing windows, as described in Equation (27), below.

$$PD_{wc-acc}^{surf}[i] = \max_{n=1,\ldots N}{}^{i} \frac{1}{t_n - t_{n-1}} \int_{t_{n-1}}^{t_n} \max\left[PD_{ins}^{in-FoV}\left(\tau, \Gamma_{radar}^{surf}, \Omega_{comm}(\tau)\right), PD_{ins}^{out-FoV}(\tau, \Omega_{comm}(\tau))\right] d\tau \tag{27}$$

Here, the operator $\max^i$ denotes the operation of getting the i-th largest value.

Another further refinement, described in Equation (28), is to limit to those processing windows with no detection only, when choosing the worst case TX configuration. In Equation (28), the expression $\mathcal{N}_{no\text{-}det}$ denotes the sets of radar processing windows of the current averaging window without target detection. It is noted that when using the Equation (28), M may be adjusted as follow described in Equation (29). In Equation (29), the expression $|\mathcal{N}_{no\text{-}det}|$ is the cardinality of the set $\mathcal{N}_{no\text{-}det}$, which is the number of radar processing frames in the current averaging window where target was not detected.

$$PD_{wc-acc}^{surf}[i] = \max_{n \in N_{no-det}}{}^{i} \frac{1}{t_n - t_{n-1}} \int_{t_{n-1}}^{t_n} \max\left[PD_{ins}^{in-FoV}\left(\tau, \Gamma_{radar}^{surf}, \Omega_{comm}(\tau)\right), PD_{ins}^{out-FoV}(\tau, \Omega_{comm}(\tau))\right] d\tau \tag{28}$$

$$M = \min\left[\lceil N\delta \rceil, \left|N_{no-det}\right|\right] \tag{29}$$

In other implementations, overlapping radar frame may be used such as the multi-frame processing with using both the first radar timing structure (long spacings between frames) and the second radar timing structure (roughly-equal-pulse-spacing structure of FIG. 3D). The approach for identifying the margin to cover misdetection can be done in the same manner. However a difference is based on the boundaries for computing $PD_{wc\text{-}acc}^{surf}[i]$. The boundaries points $t_i$ with i=0,1,2, . . . , N do not include any overlap. The overlap is used for radar processing (for increasing the robustness of the radar detection). Regarding the radar transmission timing structure, while the structure of FIG. 3C includes a more natural increment of frame duration for the overlap, the structure of FIG. 3D can allow the granularity up to the pulse level. This means that it provides more flexibility in selecting the overlap region between two radar processing frames and thus the number of radar processing frames N for an averaging window. It is noted that is an important property because for the expected number of misdetection radar processing frames M=[Nδ] to be useful, N should be large enough to provide statistical stability. It is noted that with large overlap between radar processing frames, there could be some correlation between adjacent radar processing frames. One way to take that correlation into account is when the radar detection is evaluated for measuring δ, the same kind of radar processing should be used.

Additionally, rather than first estimating δ, the measurement results could be used to directly count the number of miss-detected radar processing frames for each averaging window. The largest number observed (and plus some additional margin if extra protection is desired) could be used as M.

Figure 15:
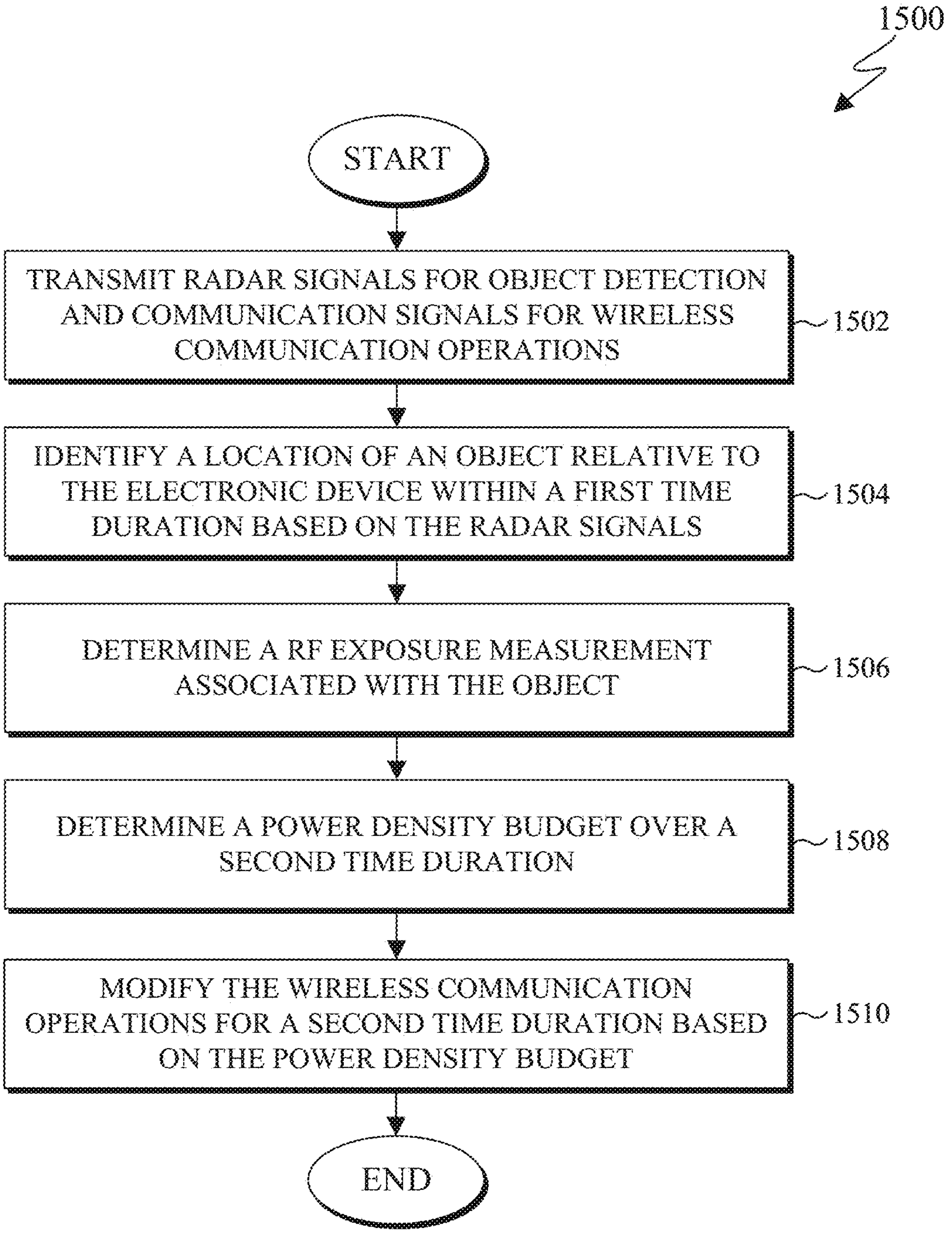
FIG. 15 illustrates an example method for exposure level estimation according to embodiments of this disclosure.

FIG. 15 illustrates an example method for exposure level estimation according to embodiments of this disclosure. The method 1500 is described as implemented by any one of the client device 106-114 of FIG. 1, the electronic device 300 of FIG. 3A the electronic device 410 of FIG. 4A and can include internal components similar to that of electronic device 200 of FIG. 2. However, the method 1500 as shown in FIG. 15 could be used with any other suitable electronic device and in any suitable system, such as when performed by the electronic device 200.

In step 1502, the electronic device 200 transmits signals for object detection. The electronic device 200 can also receive the transmitted signals that reflected off of an object via a radar transceiver, such as the radar transceiver 270 of FIG. 2. In certain embodiments, the signals are radar. The signals are used to detect an object with regions that expand from the electronic device.

In certain embodiments, the radar signals can be transmitted using a first radar timing structure or a second radar timing structure. The first radar timing structure represents pulses that are transmitted in frames of a first time interval that are separated by a frame spacing of a second time interval. The second radar timing structure represents pulses that are transmitted in frames that are separated by a frame spacing that matches a spacing between the pulses.

In step 1504, the electronic device 200 identifies a location of an object relative to the electronic device within a first time duration. The electronic device 200 identifies the location of the object based on the transmitted and received radar signals. The first time duration includes a previous time up to the current time.

In certain embodiments, the electronic device 200 determines whether the object moves over a time interval. The electronic device can determine that the object is part of a human body in response to a determination that the object moves over the time interval.

In step 1506, the electronic device 200 determines an RF exposure measurement associated with the object. The RF exposure measurement is based on the location of the object over the first time duration. In certain embodiments, the RF exposure measurement is based on a radar timing structure of the radar signals.

To determine the RF exposure measurement, the electronic device 200 can identify instantaneous power densities corresponding to the location of the object for each time instance of multiple time instances during the first time duration. The electronic device 200 can also determine the RF exposure measurement of the object based on an average instantaneous power densities over the of the multiple time instances.

When the radar signals are transmitted using the first radar timing structure, the electronic device 200 compares the second time interval to a threshold. Based on the comparison the electronic device 200 can determine that the object is stationary during the second time interval. Alternatively, based on the comparison, the electric device 200 can determine that the object will move to a new location where an RF exposure level is at a predefined value during the second time interval. The predetermined value can represent a worst case RF exposure level.

In certain embodiments, to determine the RF exposure level, when the radar signals are transmitted using the first radar timing structure, the electronic device 200 identifies a first instantaneous power density corresponding to the location of the object based on a first frame and a second frame. It is noted that the first frame and a second frame are separated by the second time interval, described above. The electronic device 200 also identifies a second instantaneous power density corresponding to the location of the object based on the second frame and a third frame. It is similarly noted that the second frame and a third frame are separated by the second time interval, described above. The electronic device 200 can then determine the RF exposure measurement based at least on the first and second instantaneous power densities.

In certain embodiments, to determine the RF exposure level, when the radar signals are transmitted using the second radar timing structure, the electronic device 200 generates processing windows that are sequential by combining a predefined number of consecutive pulses that are transmitted over a time interval. The time interval can match the second time duration The electronic device 200 then determines the RF exposure measurement based on power densities corresponding to each of the processing windows.

In certain embodiments, when the RF exposure measurement is a first RF exposure measurement and the radar signals are transmitted using the second radar timing structure, the electronic device identifies a first set of instantaneous power densities. The first set of instantaneous power densities can correspond to a number of consecutive pulses within a processing window during the first time duration. The electronic device 200 can then determine the first RF exposure measurement based on the first set of the instantaneous power densities. After the second time duration, the electronic device 200 shifts the processing window based on a duration of the second time duration. The electronic device 200 then identifies a second set of instantaneous power densities. The second set of instantaneous power densities can correspond to the shifted processing window. Thereafter, the electronic device 200 determines a second RF exposure measurement based on the second set of the instantaneous power densities.

In certain embodiments, to determine the RF exposure level, when the radar signals are transmitted using the second radar timing structure, the electronic device 200 generates multiple processing windows. Each of the processing windows includes a predefined number of consecutive pulses. Additionally, one of the processing windows partially overlaps a preceding processing window. The electronic device 200 can identify instantaneous power densities corresponding to each of the processing windows. The electronic device 200 can determine the RF exposure measurement based on the instantaneous power densities.

In step 1508, the electronic device 200 determines a power density budget over a second time duration. The power density budget is an amount of RF exposure that the object can be exposed to without exceeding an exposure limit. The exposure limit can be predetermined. The electronic device 200 determines the power density budget based on a comparison of the RF exposure measurement to an RF exposure threshold. The RF exposure threshold can be the same or different than the exposure limit. The second time duration is a duration of time from the current time until a future time. In certain embodiments, the second time duration is equal to or less than a radar processing time interval.

In step 1510, the electronic device 200 modifies the exposure level for the second time duration based on the power density budget. By modifying the exposure level for the second time duration, it can help prevent the object from exceeding allowable RF exposure levels.

Although FIG. 15 illustrates example methods, various changes may be made to FIG. 15. For example, while the method 1500 is shown as a series of steps, various steps could overlap, occur in parallel, occur in a different order, or occur multiple times. In another example, steps may be omitted or replaced by other steps.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system. None of the description in this application should be read as implying that any particular element, step, or function is an essential element that must be included in the claims scope.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device for exposure level estimation, comprising:

a radar transceiver;

a communication interface; and a processor operably connected to the radar transceiver and the communication interface, the processor configured to:

transmit (i) radar signals, via the radar transceiver, for object detection and (ii) communication signals, via the communication interface, for wireless communication operations;

identify a location of an object relative to the electronic device within a first time duration based on reflections of the radar signals, the first time duration including a previous time until a current time;

identify instantaneous power densities corresponding to the location of the object for each time instance of multiple time instances during the first time duration;

determine a radio frequency (RF) exposure measurement associated with the object based on the identified instantaneous power densities and the location of the object over the first time duration, the RF exposure measurement accumulated over the first time duration;

determine a power density budget over a second time duration based on a comparison of the RF exposure measurement to an RF exposure threshold, the second time duration including the current time until a future time; and modify the wireless communication operations for the second time duration based on the power density budget.

2. The electronic device of claim 1, wherein the processor is further configured to:

detect the object based on the reflections of the radar signals;

determine whether the object moves over a time interval; and in response to a determination that the object moves over the time interval, determine that the object is a body part of a user.

3. The electronic device of claim 1, wherein:

the RF exposure measurement is based on a radar timing structure of the radar signals; and the second time duration is equal to or less than a radar processing time interval.

4. The electronic device of claim 1, wherein to determine the RF exposure measurement, the processor is configured to:

determine the RF exposure measurement of the object based on an average of the instantaneous power densities over the multiple time instances.

5. The electronic device of claim 1, wherein the radar signals are transmitted using a first radar timing structure or a second radar timing structure, wherein the first radar timing structure represents pulses that are transmitted in frames of a first time interval that are separated by a frame spacing of a second time interval, and wherein the second radar timing structure represents pulses that are transmitted in frames that are separated by a frame spacing that matches a spacing between the pulses.

6. The electronic device of claim 5, wherein when the radar signals are transmitted using the first radar timing structure, the processor is configured to:

compare the second time interval to a threshold; and based on the comparison determine that the object (i) is stationary during the second time interval or (ii) moves to a location where an RF exposure level is at a predefined value during the second time interval.

7. The electronic device of claim 5, wherein when the radar signals are transmitted using the first radar timing structure, the processor is configured to:

identify a first instantaneous power density corresponding to the location of the object based on a first frame and a second frame;

identify a second instantaneous power density corresponding to the location of the object based on the second frame and a third frame; and determine the RF exposure measurement based at least on the first and second instantaneous power densities, wherein the first, second, and third frames are separated by the second time interval.

8. The electronic device of claim 5, when the radar signals are transmitted using the second radar timing structure, the processor is configured to:

generate processing windows that are sequential by combining a predefined number of consecutive pulses that are transmitted over a time interval; and determine the RF exposure measurement based on power densities corresponding to each of the processing windows, wherein the second time duration matches the time interval.

9. The electronic device of claim 5, wherein:

the RF exposure measurement is a first RF exposure measurement; and when the radar signals are transmitted using the second radar timing structure, the processor is configured to:

identify a first set of instantaneous power densities corresponding to a number of consecutive pulses within a processing window during the first time duration, determine the first RF exposure measurement based on the first set of the instantaneous power densities, after the second time duration, shift the processing window based on a duration of the second time duration, identify a second set of instantaneous power densities corresponding to the shifted processing window, and determine a second RF exposure measurement based on the second set of the instantaneous power densities.

10. The electronic device of claim 5, wherein when the radar signals are transmitted using the second radar timing structure, the processor is configured to:

generate processing windows, each of the processing windows includes a predefined number of consecutive pulses, wherein one of the processing windows at least partially overlap a preceding processing window;

identify instantaneous power densities corresponding to each of the processing windows; and determine the RF exposure measurement based on the instantaneous power densities corresponding to one or more of the processing windows during the first time duration.

11. A method for exposure level estimation, comprising:

transmitting (i) radar signals for object detection and (ii) communication signals for wireless communication operations;

identifying a location of an object relative to an electronic device within a first time duration based on reflections of the radar signals, the first time duration including a previous time until a current time;

identifying instantaneous power densities corresponding to the location of the object for each time instance of multiple time instances during the first time duration; and determining a radio frequency (RF) exposure measurement associated with the object based on the identified instantaneous power densities and the location of the object over the first time duration, the RF exposure measurement accumulated over the first time duration;

determining a power density budget over a second time duration based on a comparison of the RF exposure measurement to an RF exposure threshold, the second time duration including the current time until a future time; and modifying the wireless communication operations for the second time duration based on the power density budget.

12. The method of claim 11, further comprising:

detecting the object based on the reflections of the radar signals;

determining whether the object moves over a time interval; and in response to determining that the object moves over the time interval, determining that the object is a body part of a user.

13. The method of claim 11, wherein:

the RF exposure measurement is based on a radar timing structure of the radar signals; and the second time duration is equal to or less than a radar processing time interval.

14. The method of claim 11, wherein determining the RF exposure measurement comprises:

determining the RF exposure measurement of the object based on an average of the instantaneous power densities over the multiple time instances.

15. The method of claim 11, wherein the radar signals are transmitted using a first radar timing structure or a second radar timing structure, wherein the first radar timing structure represents pulses that are transmitted in frames of a first time interval that are separated by a frame spacing of a second time interval, and wherein the second radar timing structure represents pulses that are transmitted in frames that are separated by a frame spacing that matches a spacing between the pulses.

16. The method of claim 15, further comprising:

transmitting the radar signals using the first radar timing structure comparing the second time interval to a threshold; and based on the comparison determining that the object (i) is stationary during the second time interval or (ii) moves to a location where an RF exposure level is at a predefined value during the second time interval.

17. The method of claim 15, further comprising:

transmitting the radar signals using the first radar timing structure;

identifying a first instantaneous power density corresponding to the location of the object based on a first frame and a second frame;

identifying a second instantaneous power density corresponding to the location of the object based on the second frame and a third frame; and determining the RF exposure measurement based at least on the first and second instantaneous power densities, wherein the first, second, and third frames are separated by the second time interval.

18. The method of claim 15, further comprising:

transmitting the radar signals using the second radar timing structure;

generating processing windows that are sequential by combining a predefined number of consecutive pulses that are transmitted over a time interval; and determining the RF exposure measurement based on power densities corresponding to each of the processing windows, wherein the second time duration matches the time interval.

19. The method of claim 15, further comprising:

transmitting the radar signals using the second radar timing structure;

identifying a first set of instantaneous power densities corresponding to a number of consecutive pulses within a processing window during the first time duration;

determining the RF exposure measurement based on the first set of the instantaneous power densities;

after the second time duration, shifting the processing window based on a duration of the second time duration;

identifying a second set of instantaneous power densities corresponding to the shifted processing window; and determining another RF exposure measurement based on the second set of the instantaneous power densities.

20. A non-transitory computer readable medium embodying a computer program, the computer program comprising computer readable program code that, when executed by a processor of an electronic device, causes the processor to:

transmit (i) radar signals for object detection and (ii) communication signals for wireless communication operations;

identify a location of an object relative to the electronic device within a first time duration based on reflections of the radar signals, the first time duration including a previous time until a current time;

identify instantaneous power densities corresponding to the location of the object for each time instance of multiple time instances during the first time duration;

determine a radio frequency (RF) exposure measurement associated with the object based on the identified instantaneous power densities and the location of the object over the first time duration, the RF exposure measurement accumulated over the first time duration;

determine a power density budget over a second time duration based on a comparison of the RF exposure measurement to an RF exposure threshold, the second time duration including the current time until a future time; and modify the wireless communication operations for the second time duration based on the power density budget.

* * * * *